US012235833B2

United States Patent
Cruanes et al.

(10) Patent No.: US 12,235,833 B2
(45) Date of Patent: *Feb. 25, 2025

(54) DISTRIBUTED EXECUTION OF TRANSACTIONAL QUERIES

(71) Applicant: Snowflake Inc., Bozeman, MT (US)

(72) Inventors: Thierry Cruanes, San Mateo, CA (US); Moritz Eyssen, Berlin (DE); Max Heimel, Berlin (DE); Lishi Jiang, Bellevue, WA (US); Alexander Miller, San Mateo, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,826

(22) Filed: Jan. 18, 2024

(65) Prior Publication Data

US 2024/0232173 A1 Jul. 11, 2024

Related U.S. Application Data

(63) Continuation of application No. 17/823,801, filed on Aug. 31, 2022, now Pat. No. 11,921,708.

(Continued)

(51) Int. Cl.
*G06F 16/23* (2019.01)
*G06F 9/46* (2006.01)
(Continued)

(52) U.S. Cl.
CPC .... *G06F 16/2379* (2019.01); *G06F 16/24568* (2019.01)

(58) Field of Classification Search
CPC ........... G06F 16/2379; G06F 16/24568; G06F 9/524; G06F 9/466
See application file for complete search history.

(56) References Cited

U.S. PATENT DOCUMENTS 5,999,931 A 12/1999 Breitbart et al.
11,243,820 B1 2/2022 Luo et al.
(Continued)

FOREIGN PATENT DOCUMENTS

CN 113392157 9/2021
DE 202023104916 12/2023
WO 2021107988 6/2021

OTHER PUBLICATIONS

U.S. Appl. No. 17/823,801 U.S. Pat. No. 11,921,708, filed Aug. 31, 2022, Distributed Execution of Transactional Queries.
(Continued)

*Primary Examiner* — Robert W Beausoliel, Jr.
*Assistant Examiner* — Mohammad S Bhuyan
(74) *Attorney, Agent, or Firm* — Schwegman Lundberg & Woessner, P.A.

(57) ABSTRACT

The subject technology receives, at a first execution node, a first transaction, the first transaction to be executed on linearizable storage. The subject technology determines whether the first execution node corresponds to a rank indicating a leader worker. The subject technology, in response to the first execution node corresponding to the rank indicating the leader worker, performs, by the first execution node, an initialization process for executing the first transaction. The subject technology broadcasts a first read timestamp associated with the first transaction to a set of execution nodes, the set of execution nodes being different than the first execution node. The subject technology executes, by the first execution node, at least a first operation from the first transaction.

20 Claims, 12 Drawing Sheets

Related U.S. Application Data

(60) Provisional application No. 63/373,816, filed on Aug. 29, 2022.

(51) Int. Cl.
  *G06F 9/52* (2006.01)
  *G06F 16/2455* (2019.01)

(56) References Cited

U.S. PATENT DOCUMENTS

| | | | |
|---|---|---|---|
| 11,921,708 | B1 | 3/2024 | Cruanes et al. |
| 2012/0102006 | A1 | 4/2012 | Larson et al. |
| 2015/0277969 | A1 | 10/2015 | Strauss et al. |
| 2016/0050262 | A1 | 2/2016 | Kumar et al. |
| 2017/0011085 | A1 | 1/2017 | Douros et al. |
| 2017/0367023 | A1 | 12/2017 | Demchenko |
| 2018/0074919 | A1 | 3/2018 | Lee et al. |
| 2018/0075083 | A1 | 3/2018 | Lee et al. |
| 2019/0306274 | A1 | 10/2019 | Lai et al. |
| 2020/0204351 | A1* | 6/2020 | Chen .................. H04L 9/3247 |
| 2022/0092050 | A1 | 3/2022 | Luo et al. |
| 2022/0276998 | A1 | 9/2022 | Bian et al. |
| 2022/0413896 | A1 | 12/2022 | Nizar et al. |
| 2024/0070143 | A1 | 2/2024 | Cruanes et al. |

OTHER PUBLICATIONS

"U.S. Appl. No. 17/823,801, Non Final Office Action mailed Dec. 12, 2022", 38 pgs.

"U.S. Appl. No. 17/823,801, Response filed Mar. 9, 2023 to Non Final Office Action mailed Dec. 12, 2022", 14 pgs.

"U.S. Appl. No. 17/823,801, Final Office Action mailed Apr. 18, 2023", 48 pgs.

"U.S. Appl. No. 17/823,801, Response filed Jul. 17, 2023 to Final Office Action mailed Apr. 18, 2023", 11 pgs.

"U.S. Appl. No. 17/823,801, Examiner Interview Summary mailed Jul. 20, 2023", 2 pgs.

"U.S. Appl. No. 17/823,801, Non Final Office Action mailed Aug. 11, 2023", 50 pgs.

"U.S. Appl. No. 17/823,801, Response filed Nov. 13, 2023 to Non Final Office Action mailed Aug. 11, 2023", 13 pgs.

"U.S. Appl. No. 17/823,801, Examiner Interview Summary mailed Nov. 16, 2023", 2 pgs.

"U.S. Appl. No. 17/823,801, Notice of Allowance mailed Dec. 6, 2023", 9 pgs.

"European Application Serial No. 23193985.1, Extended European Search Report mailed Dec. 19, 2023", 12 pgs.

Kung, H. T., "On optimistic methods for concurrency control", ACM Transactions on Database Systems vol. 6 Issue 2, (Jun. 1, 1981), 14 pages.

Leis, Viktor, "Morsel driven parallelism a NUMA aware query evaluation framework for the many core age", SIGMOD Proceedings of the 2014 ACM SIGMOD International Conference on Management of Data, (Jun. 2014), 12 pages.

"European Application Serial No. 23193985.1, Response filed Sep. 5, 2024 to Extended European Search Report mailed Dec. 19, 2023", 10 pgs.

* cited by examiner

DISTRIBUTED EXECUTION OF TRANSACTIONAL QUERIES

CROSS-REFERENCE TO RELATED APPLICATIONS

This application is a Continuation of U.S. patent application Ser. No. 17/823,801, filed Aug. 31, 2022, which claims priority to U.S. Provisional Patent Application Ser. No. 63/373,816, filed Aug. 29, 2022; the contents of which is incorporated herein by reference in their entireties for all purposes.

TECHNICAL FIELD

Embodiments of the disclosure relate generally to a network-based database system or a cloud data platform and, more specifically, to processing concurrent transactions in a distributed manner to enable OLTP (Online Transactional Processing) in a safe and performant manner (e.g., avoiding deadlock and starvation) within the database system.

BACKGROUND

Cloud-based data warehouses and other database systems or data platforms sometimes provide support for transactional processing, referred to as OLTP, that enable such systems to perform operations that are not available through the built-in, system-defined functions. However, for mitigating security risks, security mechanisms to ensure that user code running on such systems remain isolated are needed.

BRIEF DESCRIPTION OF THE DRAWINGS

The present disclosure will be understood more fully from the detailed description given below and from the accompanying drawings of various embodiments of the disclosure.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In database systems, performing transactions on a given database can be supported. To facilitate that a given transaction is committed to a table, existing database systems can employ varying approaches including OLTP techniques. As discussed herein, OLTP (Online Transactional Processing) refers to a category of data processing that involves transaction-oriented tasks. In an example, OLTP involves inserting, updating, and/or deleting varying amounts of data in a given database. OLTP can deal with large numbers of transactions by a large number of users. Increasingly, such transactions occur within and users are working in a distributed and networked environment from varying locations and computing environments. Thus, it is also increasingly important to ensure such transactions execute and complete in a concurrent manner that protects the integrity and consistency of the data in such a distributed environment.

As described herein, the subject technology provides concurrency control and isolation for executing a series of query statements (e.g., SQL statements) within a transaction against a linearizable storage. In particular, the subject technology employs a concurrency control mechanism that is a combination of a multi-version concurrency control for read operations (MVCC) and locking for write operations. Additionally, the subject technology implements a targeted isolation level (e.g., snapshot isolation), where each statement can execute against a different snapshot of a database, and write locks are held until a transaction commit.

The subject technology, in an embodiment, implements a two-level transaction hierarchy, where a top-level transaction corresponds to a SQL transaction, and a nested transaction corresponds to a SQL statement within the parent SQL transaction. A given nested transaction can perform read and write operations, and can perform a rollback and restart execution zero or more times before succeeding.

Upon transaction commit, write operations can become visible, and write locks held by each contained statement can be released.

Figure 1:
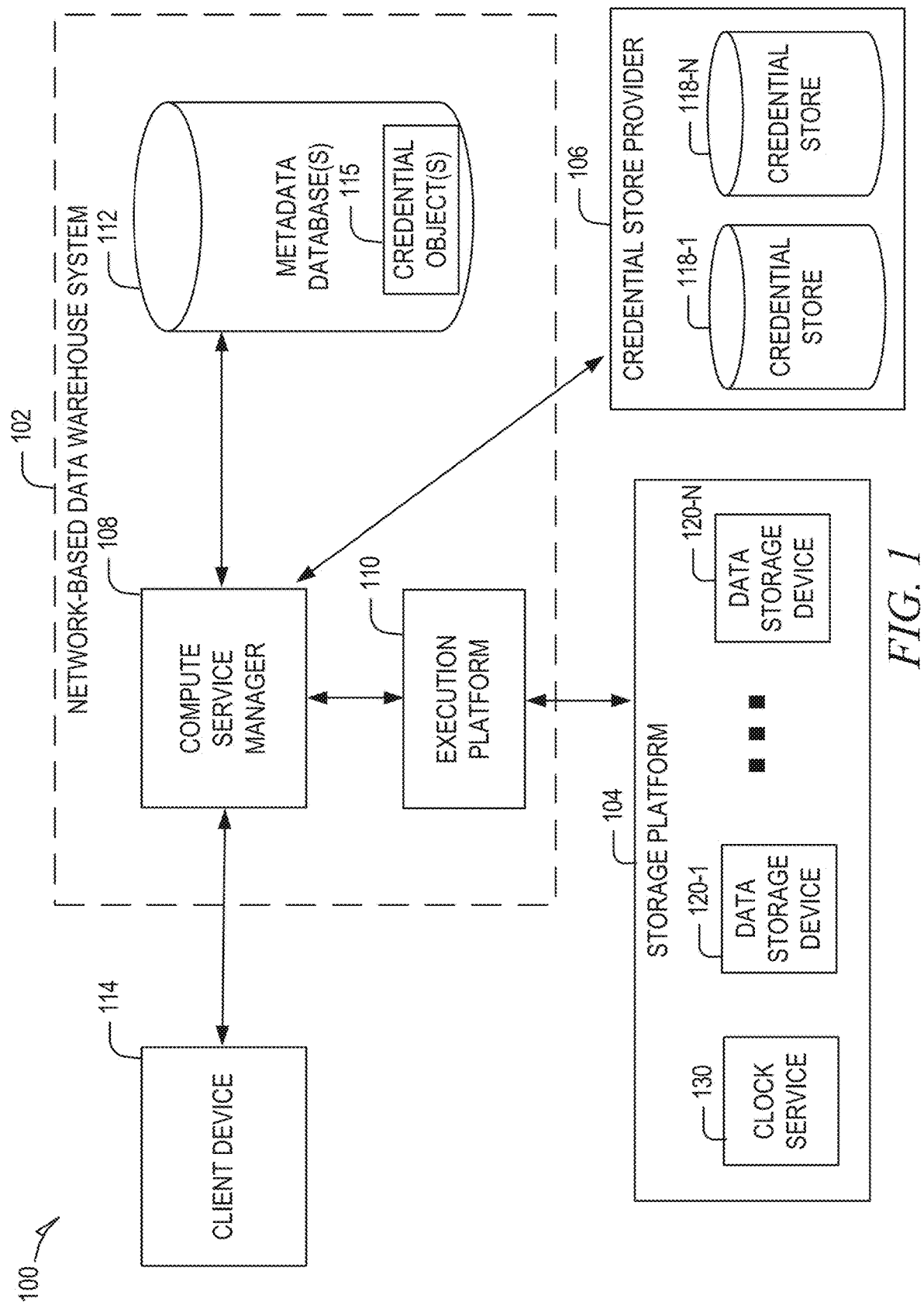
FIG. 1 illustrates an example computing environment that includes a network-based database system in communication with a cloud storage platform, in accordance with some embodiments of the present disclosure.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation (e.g., generating a query plan) as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one of more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources that execute various data storage and data retrieval tasks. The execution platform 110 is coupled to storage platform 104 of the cloud storage platform 104. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

As further shown, the storage platform 104 includes clock service 130 which can be contacted to fetch a number that will be greater than any number previously returned, such as one that correlates to the current time. Clock service 130 is discussed further herein below with respect to embodiments of the subject system.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternative embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks (or transactions as discussed further herein) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
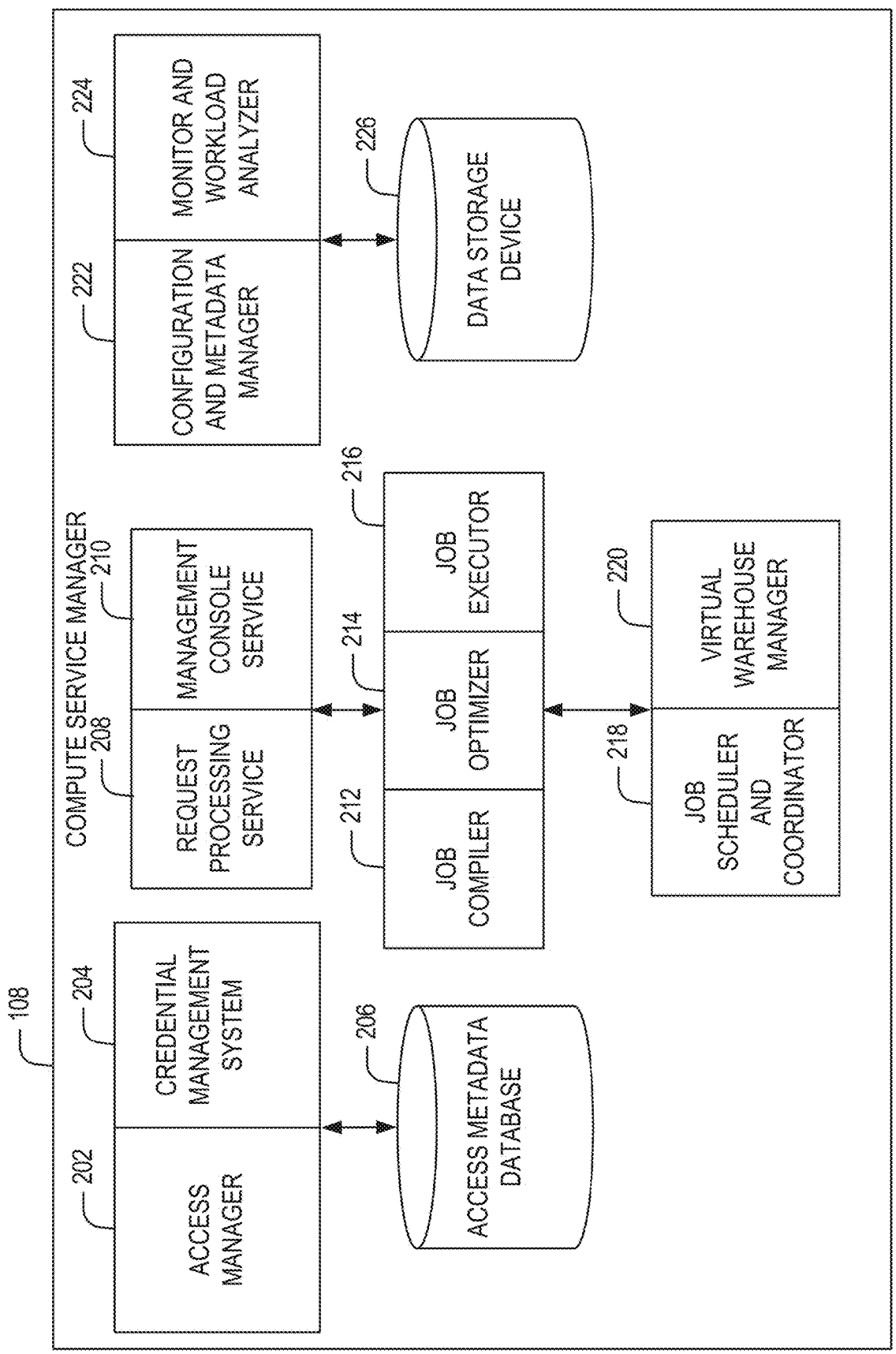
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates use of remote stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214 and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database (e.g., the storage platform 104) but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversee processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

Figure 3:
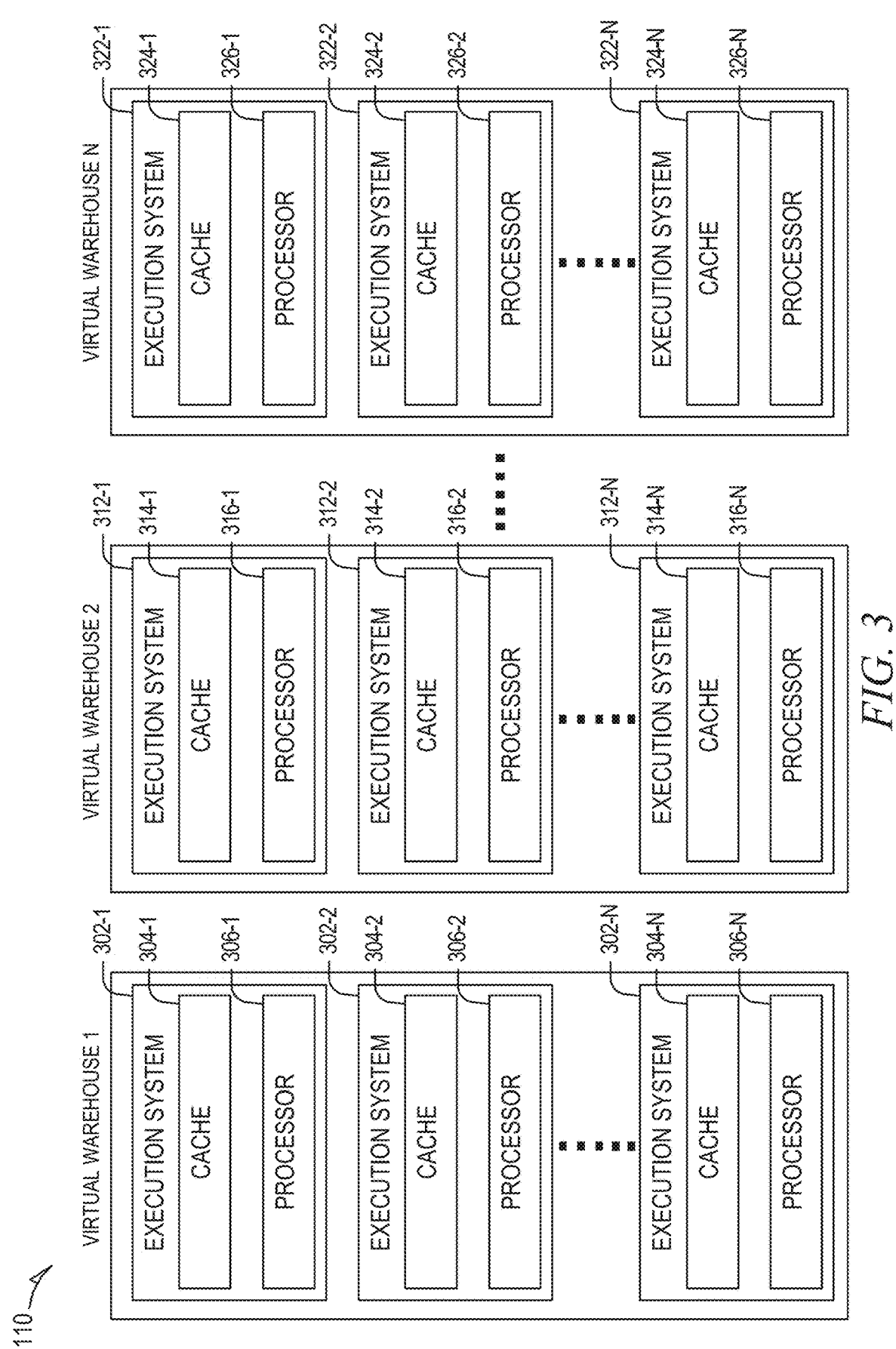
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse n. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and n are associated with the same execution platform 110, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4A:
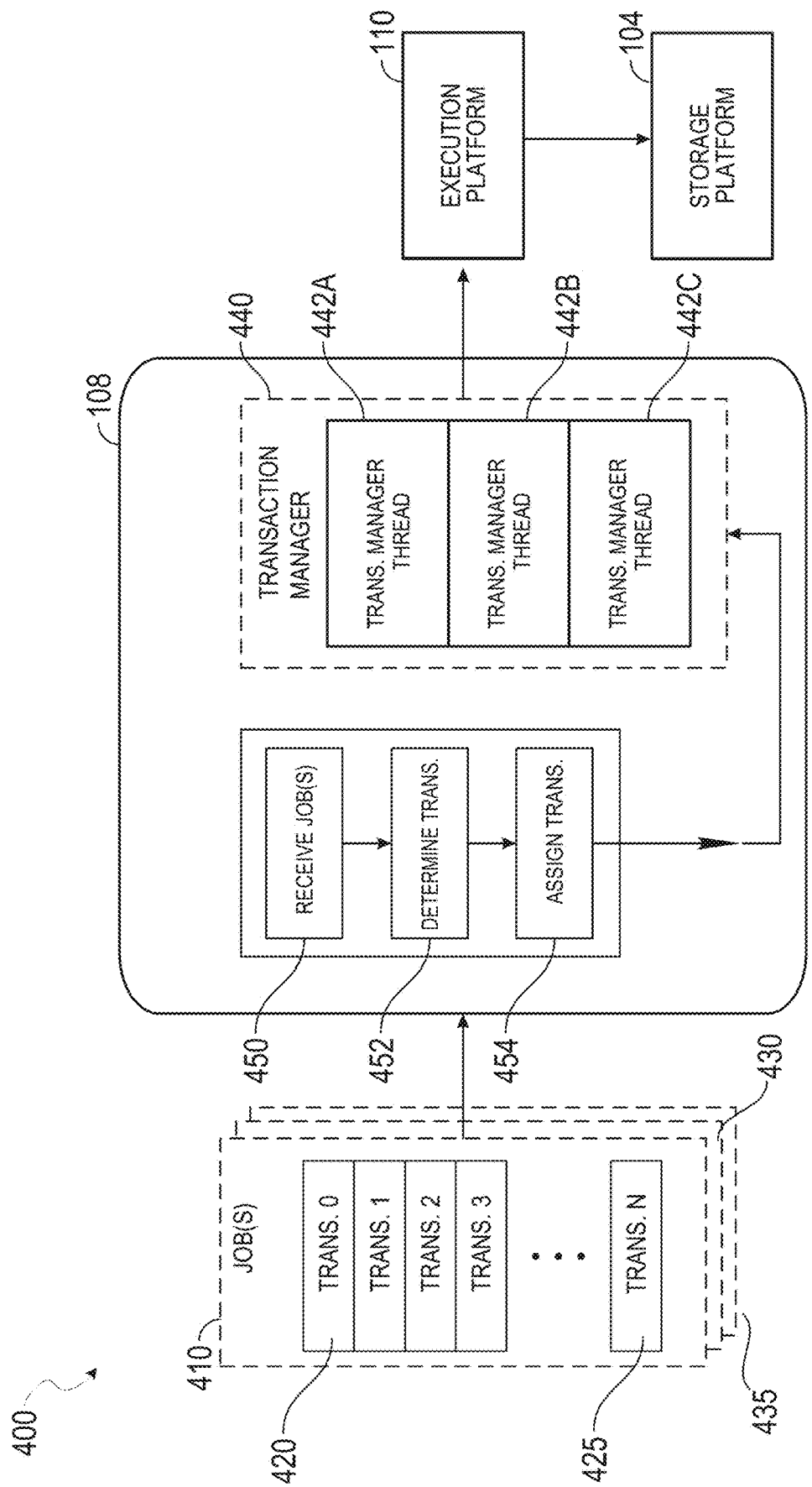
FIG. 4A is a computing environment conceptually illustrating an example software architecture for managing and executing concurrent transactions on a database system, which can be performed by a given execution node of the execution platform, in accordance with some embodiments of the present disclosure.

FIG. 4A is a computing environment 400 conceptually illustrating an example software architecture for managing and executing concurrent transactions on a database system (e.g., the network-based database system 102), which can be performed by a given execution node of the execution platform 110, in accordance with some embodiments of the present disclosure. In an embodiment, a process flow is performed by a transaction manager that is configured to manage and execute transactions as described further herein.

As shown, the transaction manager 440 is included in the compute service manager 108. The transaction manager 440 receives a job 410 that may be divided into one or more discrete transactions 420-425, e.g., transaction 0, transaction 1, transaction 2, transaction 3, and so forth through transaction (n). In an embodiment, each transaction includes one or more tasks or operations (e.g., read operation, write operation, database statement, user defined function, and the like) to perform. The transaction manager 440 receives the job at 450 and determines transactions at 452 that may be carried out to execute the job 410. The transaction manager 440 is configured to determine the one or more discrete transactions, such as transaction 0, transaction 1, transaction 2, transaction 3, and so forth, based on applicable rules and/or parameters. The transaction manager 440 assigns transactions at 454.

As further shown, the transaction manager 440 is configured to concurrently process multiple jobs that can be performed by the execution platform 110. In an example, the transaction manager 440 can receive a second job 430 or a third job 435, each of which include respective discrete transactions that are to be performed on the execution platform 110. Each of the transactions may be executed concurrently by the execution platform 110 in which different operations are performed (e.g., a respective read operation or write operation are executed from each of the transactions by the execution platform 110).

In an implementation, the job 410, including the respective transactions therein, is carried out by the transaction manager 440 which can perform the responsibilities of a query manager (e.g., processing query statements and operations, and the like). As shown, the transaction manager 440 may have multiple threads, including, for example, transaction manager threads 442a, 442b, 442c, and so forth. The transaction manager 440 may assign the job 410, including the multiple discrete transactions, to a particular virtual warehouse of the execution platform 110. Based on this assignment, the transaction manager 440 can send the job 410, including the multiple discrete transactions, to the assigned virtual warehouse for execution. Alternatively, the transaction manager 440 can send a subset of the transactions included in the job 410 for execution by the execution platform 110.

In an embodiment, as described further herein, the transaction manager 440 can perform operations to process transactions (e.g., OLTP) that may be executing concurrently, while handling conflicts and avoiding starvation of resources. Further, as described further herein, the transaction manager 440 handles conflicts between multiple transactions and concurrency issues that can arise when multiple transactions are executing in parallel on the execution platform 110. As further shown, the execution platform 110 communicates with the storage platform 104, which provides a distributed database (e.g., FoundationDB, and the like), where data can be read and written in connection with performing the transactions.

In an embodiment, the transaction manager 440 schedules and manages the execution of transactions on behalf of a client account. The transaction manager 440 may schedule any arbitrary SQL query included in a given transaction. The transaction manager 440 may assume a role to schedule the job 410 as if it is the client account rather than as an internal account or other special account. The transaction manager 440 may embody the role of, for example, an account administrator or a role having the (smallest) scope necessary to complete the job 410. In an embodiment, the transaction manager 440 embodies the role that owns the object that is the target of the job 410 (e.g. for a cluster, the table being clustered is the target).

In an embodiment, the transaction manager 440 determines transactions at 452 and assigns transactions at 454 that must be performed to fully execute the job 410. In an embodiment, the transaction manager 440 assigns ordering constraints to any number of the one or more discrete transactions, where applicable. Depending on the constraints of the job 410, the transaction manager 440 may determine that one or more of multiple discrete transactions must be serialized and executed in a particular order.

In an embodiment, the transaction manager 440 generates a report indicating when the job 410 is scheduled to be executed and how much computing resources are estimated to be tied up executing the job 410. The transaction manager 440 may alert a client account when the job 410 is being executed.

Figure 4B:
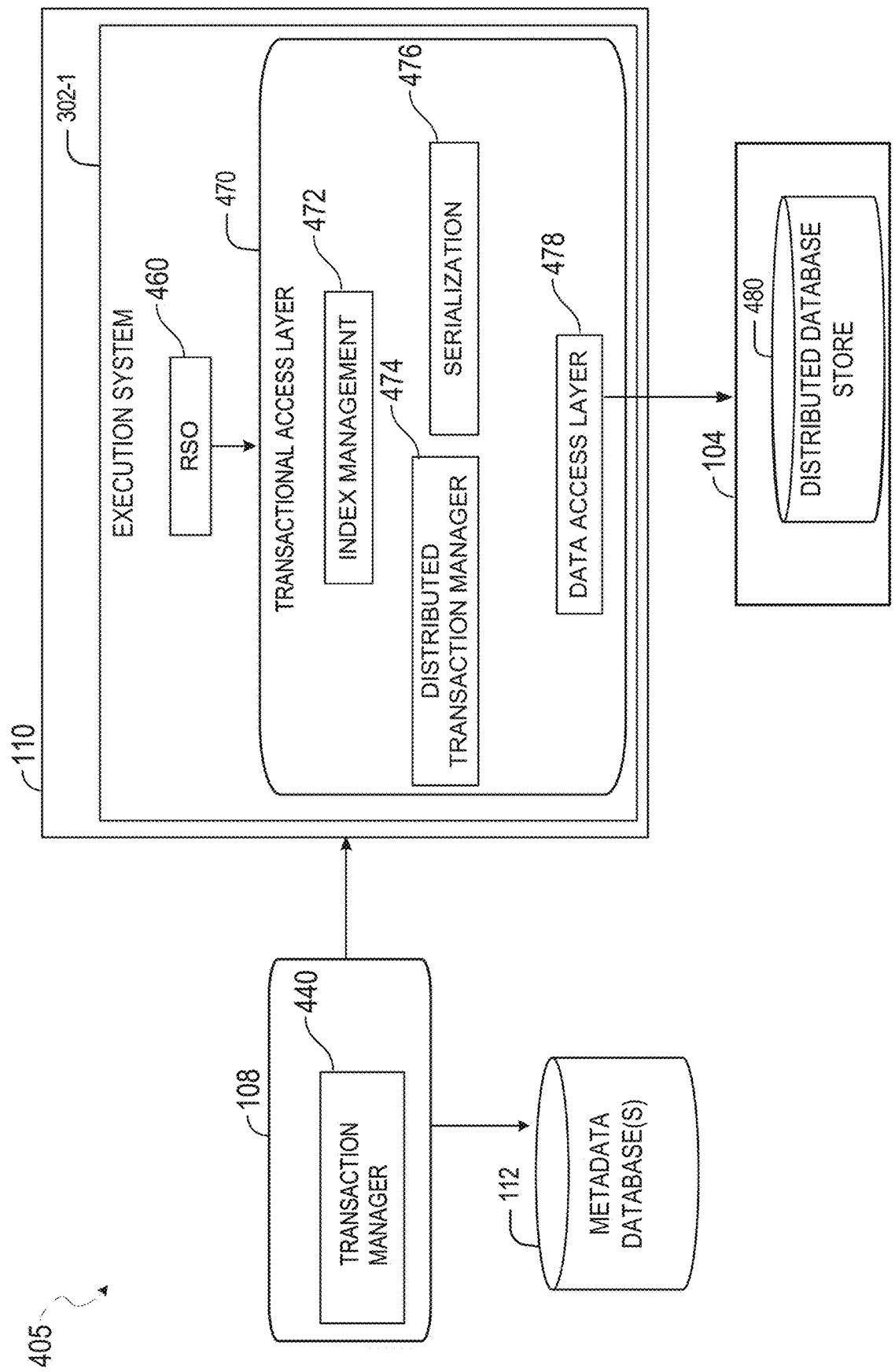
FIG. 4B is a computing environment conceptually illustrating an example software architecture for managing and executing concurrent transactions across a distributed database, which can be performed by a given execution node of the execution platform, in accordance with some embodiments of the present disclosure.

FIG. 4B is a computing environment 405 conceptually illustrating an example software architecture for managing and executing concurrent transactions on a database system (e.g., the network-based database system 102), which can be performed by a given execution node of the execution platform 110, in accordance with some embodiments of the present disclosure. Computing environment 405 is similar to the computing environment 400 discussed above in FIG. 4A and now includes additional components in execution platform 104 and storage platform 104 that will be discussed in more detail below. In particular, the additional components relate to a transactional access layer for processing operations such as rowset operators (RSOs).

As shown, computing environment 405 includes the transaction manager 440 as included in the compute service manager 108, and different states of transactions are stored in metadata database 112, which was discussed before. Some components shown in computing environment 405 that were discussed before are not further discussed in great detail to maintain the clarity and focus of the discussion of FIG. 4B.

In the example of FIG. 4B, RSO 460 is received by transactional access layer 470, which in an implementation can be understood as an OLTP data layer providing various access methods for accessing and modifying OLTP tables. In an example, transactional access layer 470 can provide an interface used to execute RSOs that centralizes index management (e.g., provided by index management component 472), constraint checking, trigger processing, and the like. Given a schema and an intended modification, the transactional access layer 470 can instruct a distributed transaction manager 474 to perform read and write operations, and also the additional write operations required by index maintenance (e.g., performed by index management component 472) or read operations required for constraint verification.

In an implementation, RSOs operate using column-oriented rowsets, and distributed transaction manager 474 operates using row-oriented key-value pairs. As also shown, serialization component 476 translates between these two representations (e.g, column-oriented and row-oriented).

In an embodiment, distributed transaction manager 474 implements a transactional layer providing a read committed (e.g., transaction isolation level) for distributed database store 480 (e.g., corresponding to a FoundationDB instance). In this example, the read committed isolation level can require aborting on write-write conflicts, which is handled by starting the query with a newer read timestamp while holding the previously taken write locks.

In embodiment, an API is provided to be used within an RSO for accessing and operating with distributed transaction manager 474. In an embodiment, distributed transaction manager 474 is a long-lived process that maintains a cache of transaction status results and performs background deadlock detection or cleanup work.

In an implementation, distributed transaction manager 474 is a transactional layer that could be used with any underlying distributed, linearizable key value store. For example, distributed database store 480 is implemented as an FoundationDB cluster storing OLTP tables. In an example, a single OLTP cluster is provided for each account, and in another example the OLTP tables of an account may reside in multiple clusters.

As also shown, data access layer 478 is responsible for interacting with FoundationDB clusters (e.g., provided in storage platform 104) in order to efficiently and reliably perform reads and writes. In an embodiment, data access layer 478 is agnostic of database concepts (e.g. tuples, transactions, columns, tables, and the like).

As discussed herein, the subject technology provides concurrency control and isolation for executing transactions (e.g., a series of SQL Statements within a SQL Transaction) against linearizable storage (e.g., a linearizable key-value store). A transaction as referred to herein includes a group of operations executed atomically. In an example, such transactions may include read and write operations but can also include operations such as increment, decrement, compare-and-swap, and the like. Further, it is appreciated that linearizable storage may include any type of distributed database (e.g., Apache HBase).

The following discussion relates to transactions in a given distributed database system. In an example, the transaction manager 440 utilizes a linearizable storage, provided by the storage platform 104, for managing and processing transactions as described herein. In an embodiment, the transaction manager 440 implements a read committed model for performing transactions. As referred to herein, a read committed model can refer to a model that ensures that all read operations performed in a given transaction sees a consistent snapshot of the database (e.g., reading a last set of committed values that existed when the read operation commenced), and the transaction itself successfully commits only if no updates that the transaction has made results in write-write conflicts with any concurrent transactions.

As discussed further herein, the transaction manager 440 implements a two-level transaction hierarchy, where a top-level transaction corresponds to a SQL transaction, and a nested transaction corresponds to a SQL statement within the parent SQL transaction. A given nested transaction can perform operations, such as reads and writes, and can perform a rollback and restart execution zero or more times before succeeding. Upon transaction commit, write operations can become visible, and write locks held by each contained statement can be released.

As mentioned before, the subject system provides concurrency control and isolation for executing a series of SQL Statements within a SQL Transaction against a linearizable storage. As discussed further herein, a transaction manager (e.g., transaction manager 440) is configured to provide a concurrency control mechanism that can be understood as a combination of multi-version concurrency control for read operations (MVCC) and locking for write operations. The subject system provides techniques for read committed isolation where each statement may execute against a different snapshot of the database (e.g., the storage platform 104), with write locks held until transaction commit.

In an embodiment, the linearizable storage as described herein enables each operation to execute atomically between invocation and response. As an example, such a linearizable key-value store ensures that operations execute in an atomic manner consistent with a "real-time" ordering of those operations e.g., when operation A completes before operation B begins, operation B should take effect after operation A. In the context of a database, a first write operation to a row in the table must take effect before a second write or read operation to the same row in the table if the second operation was issued after the first completed.

The examples described herein relate to linearizable storage such as a linearizable database, including, for example, NoSQL systems, and the like. A given NoSQL database refers to a database that stores data in a format other than a tabular format, and can store data differently than in relational tables. Further, Uber's Schemaless is an example of building linearizable Key-Value storage via having a "key" and "value" column in a relational table. Other examples of linearizable databases are: HBase, RocksDB, TiKV, Redis, Etcd.

Some examples of optimizations provided by the subject system include utilizing restricted transactional capabilities offered by some embodiments of storage platform 104, such as FoundationDB, that can be leveraged to enable a more efficient transaction implementation. For example, in a write (/lock/delete) protocol, a write operation is performed, and then a read operation is done to check for (1) any write operation that happened before the write request was submitted (2) any other write operation was submitted concurrently with the write operation that was serialized before. The following example illustrates the above:

T1 starts statement S1

S1 starts a FoundationDB Transaction, and uses its Read Version as the Read Timestamp S1 wishes to write object X, so it first reads object X as of the Read Timestamp Finding no conflicts, S1 writes X, using a timestamped operation to embed the commit timestamp in the key and setting IsCommitEmbedded.

S1 sets a read conflict range on the FoundationDB transaction for all keys with a prefix of X S1 writes a transaction status entry for ID, directly setting it to committed.

T1 commits the FoundationDB Transaction.

If the transaction commits, then there were no concurrent conflicting transactions.

If the transaction is aborted, then there was a concurrency conflicting transaction for one of the writes that were done. None of S1's writes, nor the transaction status entry will be persisted. S1 must now restart in the slow path.

In an example, a "read version" refers to a "version" or state of the database that corresponds to when a last operation was successfully committed to the database.

The following relates to a discussion of strict serializability. Whereas linearizability makes a "real-time" ordering and atomicity promise about single operations, strict serializability makes a "real-time" ordering and atomicity promise about groups of operations. In an example, the group of operations is submitted incrementally over time, with a terminal "commit" command being issued. The strictly serializable storage platform may employ techniques such as pessimistic lock-based exclusion or an optimistic validation phase to enable this functionality. In this example, the group of operations is referred to as a transaction as mentioned herein. The subject system can impose restrictions on the transaction, such as the number, size, or duration of the operations, and always reject transactions that exceed these limits.

In an embodiment, read operations may be optimized in the following manner. When reading with a given read timestamp, it may not be feasible for any transaction started after the read timestamp to commit before the read timestamp. Thus, if the Transaction ID is set to be the same as the first statement's read timestamp, then instead of reading [X.0, X.inf], the subject system can read [X.0, X.readTimestamp]. Consequently, this approach can make read operations for old or frequently written data more efficient.

In an embodiment, the subject system implements a two-level transaction hierarchy, where the top-level transaction corresponds to a SQL Transaction, and the nested transaction (referred to as a "StatementContext") corresponds to a SQL statement within the parent SQL Transaction. A given StatementContext object performs read and write operations and may be instructed to perform a rollback and restart execution zero or more times before succeeding. In an example, transactions control the collective visibility of all write operations from successful statements. Upon transaction commit, all write operations become visible, and all write locks held by each contained statement are released.

In an embodiment, each object key is associated with a stamp that uniquely identifies a single execution attempt of a statement, which can be by appending a three-part tuple of (Transaction ID, statementNumber, restartCount). The higher order component is the transaction identifier assigned to the SQL-level transaction. The statementNumber identifies the SQL statement within the SQL-level BEGIN/COMMIT block. The restart count tracks which statement restart attempt generated this write operations. A StatementContext object is instantiated with this stamp, and applies it to all writes performed through the StatementContext instance.

Stamping keys this way has a number of desirable properties. First, if key1<key2, then key1.suffix1<key2.suffix2, regardless of the values of suffix1 and suffix2. If key1=key2, then the transactionID component of the suffix allows us to resolve the commit status of the object to determine its visibility to the statement. If transactionID1=transactionID2, then Statement Number allows statements to see writes performed by previous statements within the same transaction. The restartCount component of the suffix enables the system to detect and delete obsolete versions of the object that had been left around when a statement has to be restarted.

In a similar fashion each execution of a statement is given a three-part identifier consisting of the statement's read- Timestamp (RTS) and the current values of statementNumber (SN) and restartCount (RC). This approach ensures that each statement that is part of the execution of a SQL statement (or more generally a SQL Transaction), sees either data committed before the SQL statement started or by data written or updated by the transaction itself.

In an embodiment, the transaction manager 440 employs a Transaction Status Table (TST) to keep track of committed and aborted transactions. The TST is a persistent hashmap that maps Transaction ID to its metadata, most notably a list of finalized statement numbers and their final restart count, and the commit outcome including the transaction's commit timestamp (CTS). Transactions that are in progress do not exist in the Transaction Status Table. In an embodiment, the TST can be stored in the storage platform 104, or within memory or cache of the execution platform 110.

The following discussion relates to a read protocol that is utilized by the transaction manager 440.

In an embodiment, the transaction manager 440 uses a read committed transaction isolation level, and each statement may be run with a different read timestamp. In an example, the read request for a given key (or a range of keys) is implemented by executing a linearizable storage read call for all keys with X as their prefix. The call returns versions of X with their stamps and values. The read method returns either the latest version of X made by a transaction that committed before the SQL statement started or which was written by an the most recent statement of the transaction itself that was not canceled (if any).

The following discussion relates to a write protocol that is utilized by the transaction manager 440.

In an embodiment, the write protocol checks both for WW (write-write) conflicts and WW deadlocks. The following example describes a single transaction and no conflicts. Assume that object X initially has a stamp of TXN1.0.0 and was committed at timestamp 10. In the following example, it should be understood that the following transactional steps described further below can be done within one transaction, and collectively committed. On failure, or upon exceeding the limitations of the underlying transactional system, the execution can fall back to issuing the operations individually as described in further detail below.

T2 starts and creates S1 of StatementContext(ID=TXN2, Statement Number=1, restartCount=0)

Assume that the constructor obtains a read timestamp from the linearizable storage of 15 by contacting the clock service 130. As mentioned before, the clock service 130 is a component of the storage platform 104 which can be contacted to fetch a number that will be greater than any number previously returned, such as one that correlates to the current time. In an embodiment, clock service 130 is provided separately and is independently contactable from the linearizable storage, or can be integrated into the linearizable storage such that the clock value may be inserted into a written value. The latter operation will be referred to as a timestamped write.

To update value of X, the following sequence of actions is performed in an embodiment:

```
{
  S1 does a linearizable storage write for X.TXN2.1.0 with a value of
  100
  // The next step is for S1 to check for WW (write-write) conflicts by
  checking whether there is
  // another transaction that has updated X between the RTS and S1's
  write.
  S1 issues the range read [X.0, X.inf] to obtain the set all versions of
  X and their stamps
  The read returns [X.TXN1.0.0, X.TXN2.1.0].
  S1 looks up TXN1 in the Transaction Status Table, finds a commit
  timestamp of 10.
  10 is earlier than our read timestamp of 15, so it is not a conflict.
  S1 ignores [X.TXN2.1.0] as it belongs to S1
  // Assume for now, there were no conflicts detected
  S1 finalizes, and records (statement number=1, restart count=0) into
  the transaction
  status table for TXN2
}
```

T2 commits. This will cause the Transaction Status Table record to be updated in linearizable storage to reflect that TXN2 is now committed and its commit timestamp of 20.

At this point there will be two versions of X, one stamped with TXN1.0.0 and the other TXN2.1.0. Subsequent transactions that read X can determine if this new version of X was written by a committed transaction by reading the transaction status record, and determine the CTS of the transaction.

The write protocol for transaction T can now be stated.

In an implementation, each row (object) updated requires two separate linearizable storage transactions:

1) The first linearizable storage transaction of T inserts a new version of the object with its key X suffixed with three-part suffix (T.ID, T.statementNumber, T.restartCount).

2) The second linearizable storage transaction issues a range read with the prefix "X." to obtain the SCT (set of conflicting transactions). The result set is a list of committed or active transactions that wrote (or are writing) new versions of X.

There are a number of possible distinct outcomes to this linearizable storage read call that are evaluated in the following order:

1) SCT is empty in which case T is trivially allowed to proceed.

2) SCT is not empty, but for all Ti in SCT, Ti has committed before T's read timestamp, and thus are not WW (write-write) conflicts. T may proceed.

3) SCT is not empty; for all Ti in SCT, Ti is committed; and there exists a Ti in SCT, such that its CTN is greater than T's read timestamp. T is permitted to restart without delay.

4) SCT is not empty, and for one or more Ti in SCT, Ti has not yet committed or aborted. T must wait for all transactions in SCT to complete before restarting the current statement.

5) SCT is not empty, and for one or more Ti in SCT, Ti. TransactionID is the same as our own transaction ID, and Ti. StatementCount is less than our current statement count. This means that currently the lock is held, as a previous statement took it and successfully finished its execution. T may proceed.

6) SCT is not empty, and for one or more Ti in SCT, TI. TransactionID is the same as our own transaction ID, Ti. StatementCount is the same as our own StatementCount, and Ti.RestartCount is less than our own restart count. This is a lock from a previous execution of our own transaction, thus T holds the lock on this row, and T may proceed.

For all cases, the object (X.Stamp, Value) will be left in the database (e.g., the storage platform 104). For (3) and (4) which require restarts, the object is left to serve as a write lock. In general, all tentative writes for an object X will form a queue of write locks. (5) and (6) illustrate the cases where previously left write locks allow subsequent statements or restarts of a statement to recognize that they already hold the lock that they wish to take.

The following discussion describes an example that illustrates a write-write (WW) conflict. A write-write conflict, which is also understood as overwriting uncommitted data, refers to a computational anomaly associated with interleaved execution of transactions. To simplify the example, stamps are omitted. Assume that before either T1 or T2 starts that object X has a value of 500, a stamp of TXN1.0.0, and a CTN of 10.

T1 starts and gets a read timestamp of 15
T2 starts and gets a read timestamp of 20
T2 writes (key=X.T2, value=100)
T2 issues a linearizable storage read with range [X.0, X.Inf]. The set SCT will be empty so T2 continues
T1 writes (key=X.T1, value=50)
T1 issues a linearizable storage read with range [X.0, X.Inf]. The set SCT will contain T2 so T1 must restart
T2 successfully commits. T1's CTN for X will be >20. Assume it is 21 After waiting until T2 either commits or aborts, T1 restarts the statement with a read TS>21.

The following discussion relates to a delete protocol utilized by the transaction manager 440.

In an embodiment, delete operations are implemented as a write of a sentinel tombstone value; otherwise, delete operations employ the same protocol as write operations. When a read operation determines that the most recently committed key is a tombstone, it considers that key to be non-existent.

The following discussion relates to a lock protocol utilized by the transaction manager 440.

To support a query statement of SELECT . . . FOR UPDATE, the transaction manager API offers StatementContext::lock(Key), which allows rows to be locked without writing a value to them. The implementation of lock( ) follows the write protocol, except that it writes a special sentinel value to indicate the absence of a value (distinct from SQL NULL). A SELECT . . . FOR UPDATE statement may also be forced to restart several times before the statement finishes successfully. Once it does, subsequent statements in the transaction will recognize the existence of this key as an indication that they hold the lock (in accordance with cases (5) and (6) above). All reads can ignore the key as a write.

The following discussion relates to determining whether to commit, abort, or restart a given transaction which can be determined by the transaction manager 440.

When a transaction finishes its execution, it will either have an empty SCT, indicating that the commit can proceed, or an SCT with one or more conflicting transactions, indicating that the transaction will need to restart.

When a statement is restarted, all writes stamped with a lower restartCount are left in the database (e.g., the storage platform 104) as provisional write locks for the next execution. The next execution of the statement might write a different set of keys. The set difference between the first and second execution form a set of orphaned writes that must be removed and never become visible. The statement itself may not be relied upon to always be able to clean up its own orphaned writes, as in the event of a process crash, the location of the previous writes will have been forgotten. Finalizing statements and recording the restart count of the successful execution promises that only the results of one execution will ever become visible, and permits orphaned writes to be lazily cleaned up.

A transaction is committed, and all of its writes made visible, by inserting its Transaction ID into the Transaction Status Table. The commit timestamp is filled in by the clock service 130 or directly by the distributed database (e.g., FoundationDB), such that it is higher than any previously assigned read or commit timestamps. All writes must have completed before a statement may be finalized, and all statements must be finalized before the transaction may be committed.

A transaction is aborted by inserting its Transaction ID into the Transaction Status Table, with its transaction outcome set as aborted. The list of finalized statements and their restart counts will be reset to an empty list. The insertion into the Transaction Status Table will make the abort outcome visible to all conflicting transactions, and all writes performed by finalized statements may be proactively or lazily removed from the database (e.g., the storage platform 104).

When a statement tries to finalize with a non-empty SCT, it waits for commit outcomes to be persisted to the Transaction Status Table for all conflicting transactions. Once all conflicting transactions have committed or aborted, then the transaction will begin its restart attempt.

The following discussion relates to an API (e.g., the transaction manager API as referred to below) that can be utilized (e.g., by a given client device) to send commands and requests to the transaction manager 440.

A SQL transaction contains a sequence of one or more SQL statements. Each SQL statement is executed as a nested transaction, as implemented by the transaction manager StatementContext class. Each transaction manager statement itself is executed as one or more database transactions.

In an embodiment, the transaction manager API is divided into two parts: 1) the data layer, which provides a read and write API to the transaction execution processes; and 2) the transaction layer, which provides, to the compute service manager 108, an API to orchestrate the transaction lifecycle. In an implementation, transactions operate at a READ COMMITTED isolation level and implement MVCC on top of the distributed database (e.g., storage platform 104) to avoid taking any read locks.

Consider the following example SQL query:
Update emp. Salary=emp. Salary*1.1 where emp.Dept="shoe";

In an example, an instance of the StatementContext class will be created to execute this SQL statement. The constructor contacts the linearizable storage transaction manager to begin a linearizable storage transaction and obtain a linearizable storage STN which is then stored in the readTimestamp variable.

The Update operation then executes across any number of execution nodes, all using the same StatementContext instance. In an example, a function rangeRead( ) will be used to scan the base table, or an index on Dept, for the tuples to update. A series of write( ) calls will be made to update the salary of all matching employees.

A call to finalize( ) will return CONFLICT if the statement encountered any conflicts during its execution, to indicate that re-execution is needed. The key to restarts making progress is that the first execution of the statement will have the side effect of, in effect, setting write locks on the objects being updated. This ensures that when the statement is re-executed the necessary writes locks have already been obtained and the statement will generally (but not always).

Next, consider an example illustrating Write-Write conflicts between 3 transactions:

T1 starts S1 with timestamp 10
T2 starts S2 with timestamp 20
T3 starts S3 with timestamp 30
S1 writes X
S2 writes Y
S3 writes Z
S1 writes Y, and notes the conflict with T2
S2 writes Z, and notes the conflict with T3
S3 writes X, and notes the conflict with T1

In this case described above, three transactions are involved in a deadlock. Each statement believes that it must restart and wait for the execution of the previous transaction to finish. No transaction has the complete information to know that it is involved in a deadlock.

Thus, when a statement fails to finalize due to conflicts, it instead writes its conflict set into the database (e.g., the storage platform 104). These conflict sets may be read by all other transactions, allowing them to detect a cycle in the waits-for graph, indicating that they're involved in a deadlock.

Figure 5:
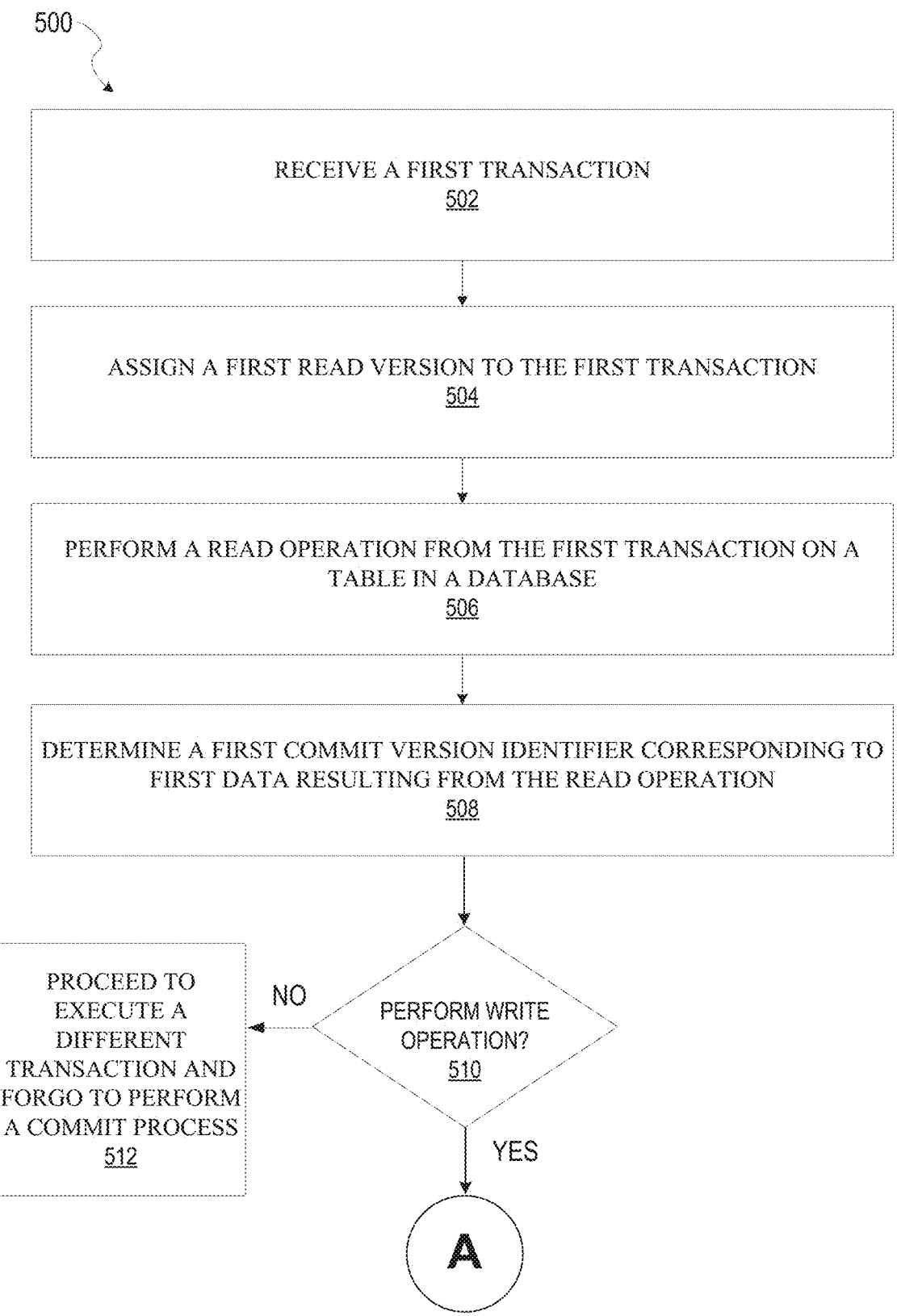
FIG. 5 is a flow diagram illustrating operations of a database system in performing a method, in accordance with some embodiments of the present disclosure.

FIG. 5 is a flow diagram illustrating operations of a database system in performing a method, in accordance with some embodiments of the present disclosure. The method 500 may be embodied in computer-readable instructions for execution by one or more hardware components (e.g., one or more processors) such that the operations of the method 500 may be performed by components of network-based database system 102, such as components of the compute service manager 108 or a node in the execution platform 110. Accordingly, the method 500 is described below, by way of example with reference thereto. However, it shall be appreciated that the method 500 may be deployed on various other hardware configurations and is not intended to be limited to deployment within the network-based database system 102.

At operation 502, the transaction manager 440 receives a first transaction, the first transaction to be executed on linearizable storage.

At operation 504, the transaction manager 440 assigns a first read version to the first transaction, the first read version indicating a first version of the linearizable storage. Alternatively, a read timestamp can be retrieved from a clock service (e.g., the clock service 130), and a transaction identifier can be assigned to the first transaction where the transaction identifier corresponds to a read start time.

At operation 506, the transaction manager 440 performs a read operation from the first transaction on a table in a database.

At operation 508, the transaction manager 440 determines a first commit version identifier corresponding to first data resulting from the read operation.

At operation 510, the transaction manager 440 determines whether a particular write operation is included in the first transaction. If the particular write operation is to be performed with the first transaction, then the transaction manager 440 proceeds to perform a method as described below in FIG. 7.

Alternatively, when the transaction manager 440 determines that a particular write operation is absent from the first transaction, at operation 512, the transaction manager 440 proceeds to execute a different transaction (along with foregoing to perform a commit process for the first transaction), which is described, in an example, in FIG. 6 below. It is appreciated that due to the concurrency of transactions that are performed, the operations described further below in FIG. 6 can be executed at any time during the operations described in FIG. 5 above.

Figure 6:
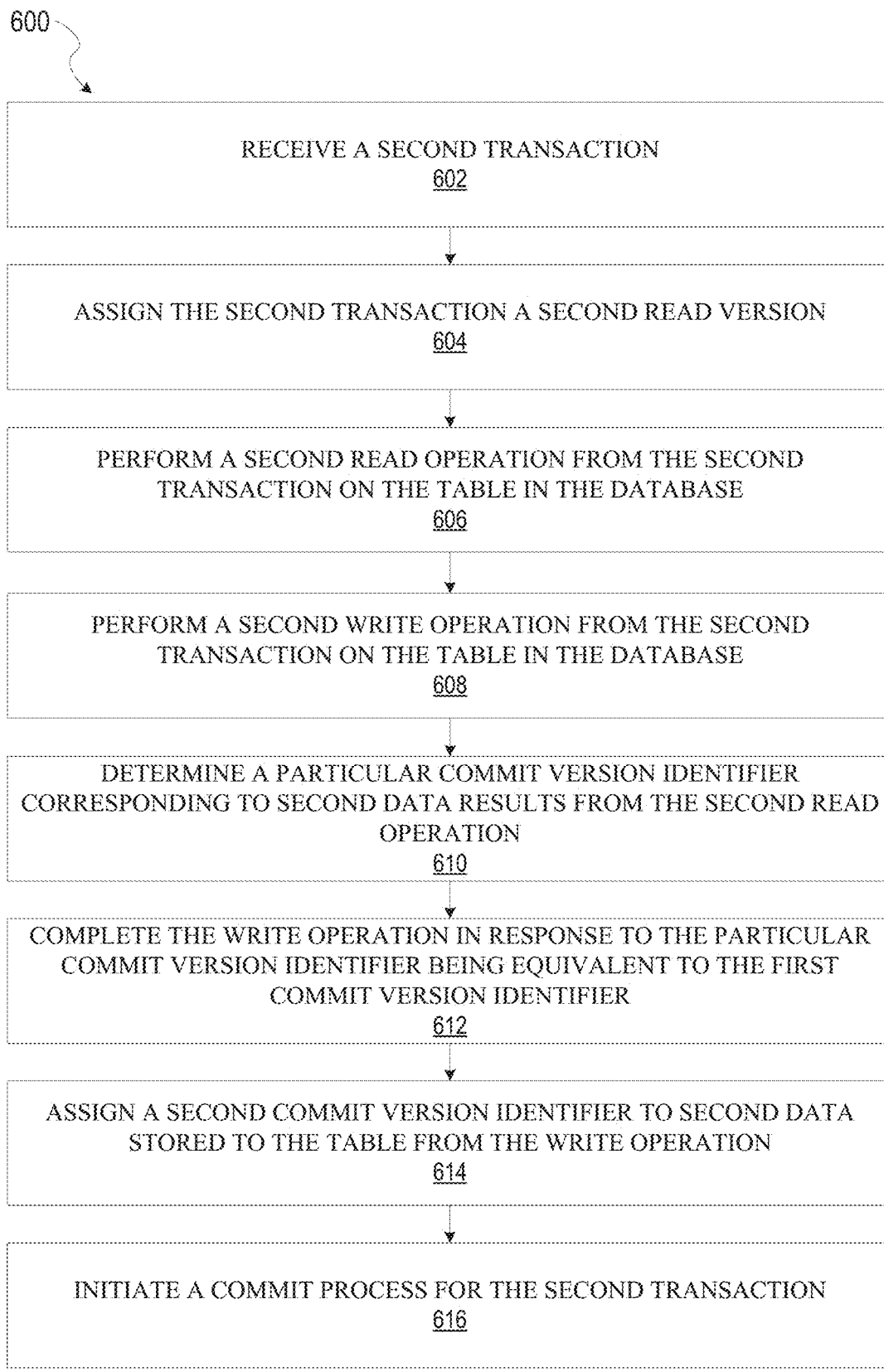
FIG. 6 is a flow diagram illustrating operations of a database system in performing a method, in accordance with some embodiments of the present disclosure.

FIG. 6 is flow diagram illustrating operations of a database system in performing a method, in accordance with some embodiments of the present disclosure. The method 600 may be embodied in computer-readable instructions for execution by one or more hardware components (e.g., one or more processors) such that the operations of the method 600 may be performed by components of network-based database system 102, such as components of the compute service manager 108 or a node in the execution platform 110. Accordingly, the method 600 is described below, by way of example with reference thereto. However, it shall be appreciated that the method 600 may be deployed on various other hardware configurations and is not intended to be limited to deployment within the network-based database system 102.

In some embodiments, the method 600 can be performed in conjunction with the method 500 as discussed above. For example, the method 600 can be performed after the operations of the method 500 or performed substantially concurrently with the method 500.

At operation 602, the transaction manager 440 receives a second transaction, the second transaction to be executed on linearizable storage.

At operation 604, the transaction manager 440 assigns the second transaction a second read version, the second read version indicating a second version of the linearizable storage.

At operation 606, the transaction manager 440 performs a second read operation from the second transaction on the table in the database.

At operation 608, the transaction manager 440 performs a second write operation from the second transaction on the table in the database.

At operation 610, the transaction manager 440 determines a particular commit version identifier corresponding to second data results from the second read operation.

At operation 612, the transaction manager 440 completes the write operation in response to the particular commit version identifier being equivalent to the first commit version identifier.

At operation 614, the transaction manager 440 assigns a second commit version identifier to second data stored to the table from the write operation, the second commit version identifier corresponding to a second version of data in the table, the second commit version identifier different than the first commit version identifier.

At operation 616, the transaction manager 440 initiates a commit process for the second transaction.

Figure 7:
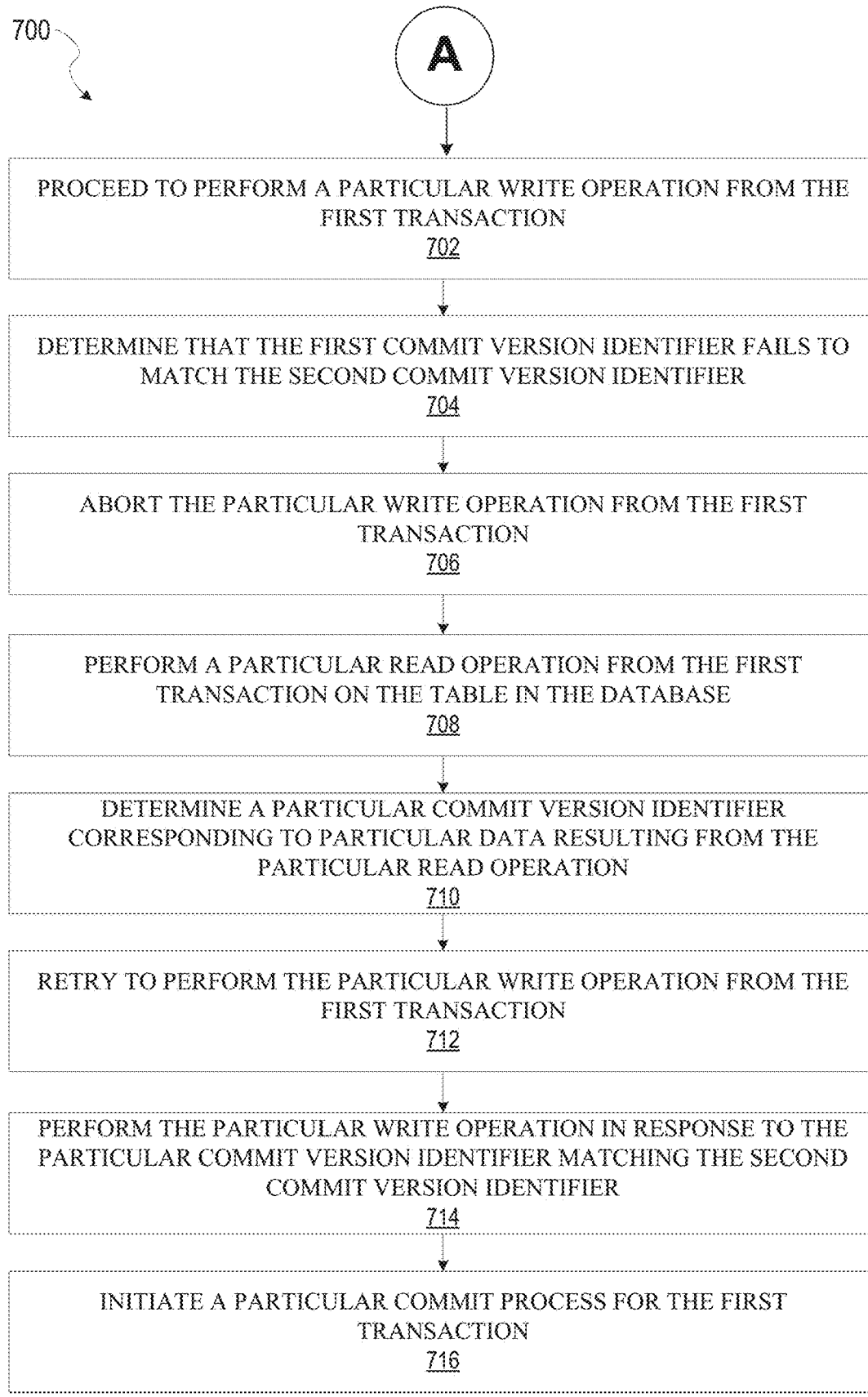
FIG. 7 is a flow diagram illustrating operations of a database system in performing a method, in accordance with some embodiments of the present disclosure.

FIG. 7 is a flow diagram illustrating operations of a database system in performing a method, in accordance with some embodiments of the present disclosure. The method 700 may be embodied in computer-readable instructions for execution by one or more hardware components (e.g., one or more processors) such that the operations of the method 700 may be performed by components of network-based database system 102, such as components of the compute service manager 108 or a node in the execution platform 110. Accordingly, the method 700 is described below, by way of example with reference thereto. However, it shall be appreciated that the method 700 may be deployed on various other hardware configurations and is not intended to be limited to deployment within the network-based database system 102.

In some embodiments, the method 700 can be performed in conjunction with the method 500 and the method 600 as discussed above. For example, the method 700 can be performed after the operations of the method 500 or the method 600 (or performed substantially concurrently therewith either method).

At operation 702, the transaction manager 440 proceeds to perform a particular write operation from the first transaction.

At operation 704, the transaction manager 440 determines that the first commit version identifier fails to match the second commit version identifier.

At operation 706, the transaction manager 440 aborts the particular write operation from the first transaction.

At operation 708, the transaction manager 440 performs a particular read operation from the first transaction on the table in the database.

At operation 710, the transaction manager 440 determines a particular commit version identifier corresponding to particular data resulting from the particular read operation.

At operation 712, the transaction manager 440 retry to perform the particular write operation from the first transaction.

At operation 714, the transaction manager 440 perform the particular write operation in response to the particular commit version identifier matching the second commit version identifier At operation 716, the transaction manager 440 initiates a particular commit process for the first transaction.

Embodiments of the subject technology enable distributed execution of transactions involving hybrid tables (e.g., stored on linearizable storage provided by a distributed database such as FoundationDB).

In an example, databases have some transaction-related metadata that is required in order to be able to perform data modifications associated with the transaction. Distributed databases need this metadata to be known by all processes performing modifications on behalf of the database.

Some databases do not perform distributed query execution, and thus do not need to distribute this information. Some databases initialize this information before scheduling a query for execution. Some databases rely on the database storage itself to synchronize and distribute the metadata.

Embodiments of the subject technology described in further detail below provide the following advantages:

All query execution processes may perform data modifications.

Query execution over non-transactional data may begin before transactional metadata has been initialized and distributed.

Transactional metadata is eagerly initialized and lazily consumed.

In an implementation, for key value tables, a given compute service manager (e.g., providing an SQL engine) enables SQL execution on top of a given distributed database (e.g., FoundationDB). Queries performed on key value (KV) tables have slightly different query plans, with KV-specific rowset operators (e.g., an RSO functions as an operator handling one or more result sets) replacing those that would operate on the distributed DB. In an implementation, a transaction manager (e.g., distributed transaction manager 474 discussed before) is provided that runs within an execution node (e.g., execution node 302-1), and implements SQL transactions at a read committed isolation level (e.g., read committed isolation level) on a distributed database. In an embodiment, an instance of distributed transaction manager 474 can be provided on each execution node where transactions (e.g., various RSOs) are being executed. Further, in an implementation, distributed transaction manager 474 can perform the same or similar functionality described in connection with transaction manager 440 discussed above.

Figure 8:
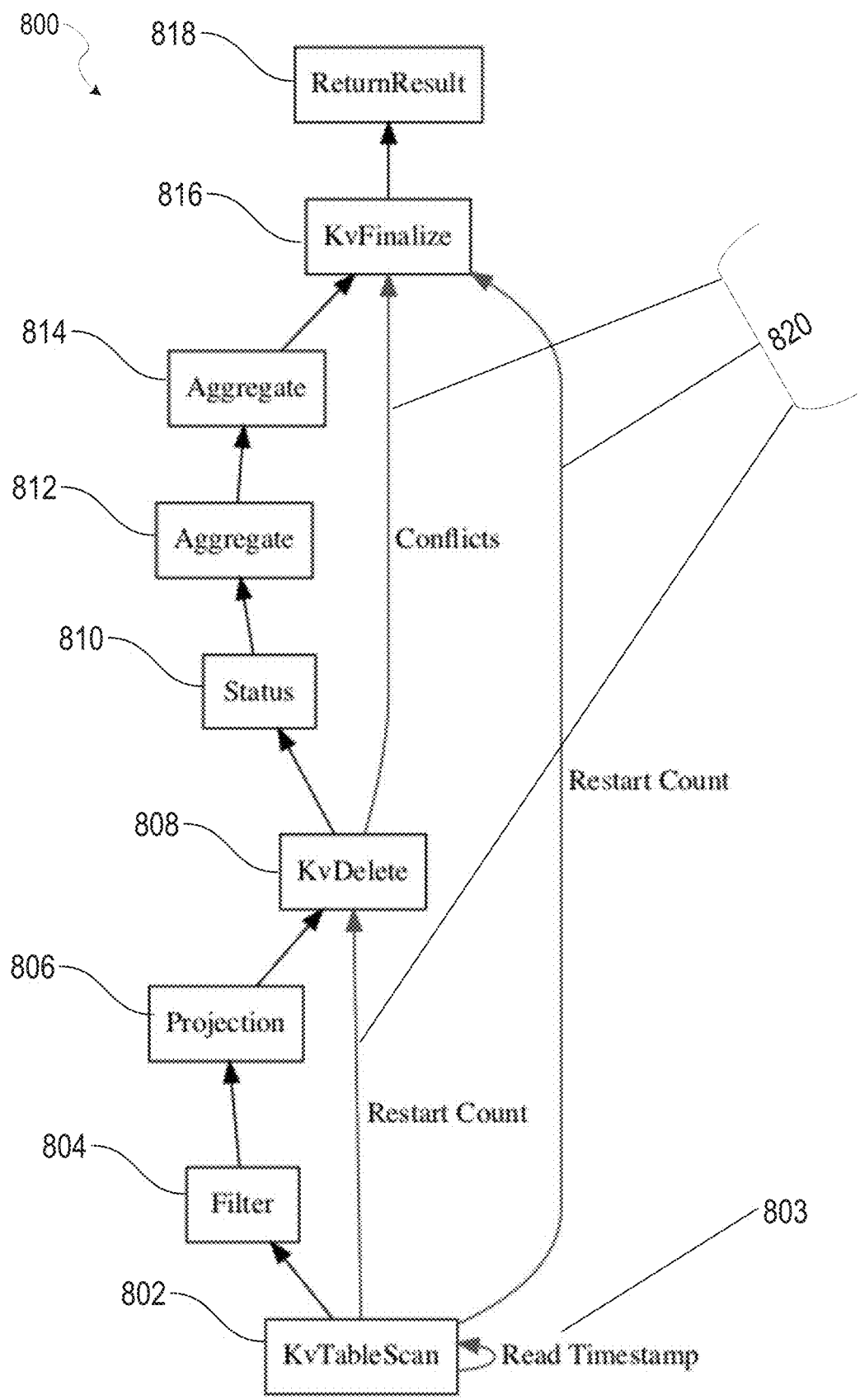
FIG. 8 illustrates an example block diagram of a processing flow of operations performed by a database system in accordance with embodiments of the subject technology.

FIG. 8 illustrates an example block diagram of a processing flow of operations performed by a database system in accordance with embodiments of the subject technology. The processing flow is represented as query plan 800, in an implementation, and is executed at least by a transaction manager (e.g., distributed transaction manager 474) that runs within an execution node (e.g., execution node 302-1), and can work in conjunction with a distributed database (distributed database store 480) on a storage platform (e.g., storage platform 104).

As shown, query plan 800 includes a set of operations including key value table scan 802, filter 804, projection 806, key value delete 808, status 810, aggregate 812, aggregate 814, key value finalize 816, and return result 818.

The model of how OLAP/micro-partitions queries reads a consistent snapshot fundamentally differs from an OLTP/distributed database. In OLAP, the SDL (storage definition language) contains a set of files derived from a specific table version. These files only contain data specifically for that version. In OLTP, the SDL contains the distributed database key boundaries of the table, and distributed transaction manager 474 determines a read timestamp when beginning to execute a query. A distributed database (e.g., distributed database store 480) contains all versions of data, and the distributed transaction manager 474 filters out extraneous versions to see a consistent snapshot. In an example, a read timestamp has no mapping or relevance to/from a lamport clock. This difference is also reflected in the query plans: OLAP query plans model all modifications as an insert, whereas OLTP query plans have KvInsert, KvUpdate, and KvDelete RSOs (e.g., key value insert, key value update, key value delete rowset operators) that perform direct modification of the database using the subject system.

Write operations can also differ significantly. OLAP/micro-partitions have all writes performed atomically under a global lock. When transaction manager 474 is asked to write a row to distributed database, transaction manager 474 looks for other writes from uncommitted transactions, which would signify a write-write conflict with the current statement. The last step of query execution, key value finalize 816, checks to see if a statement encountered conflicts during execution. If conflicts were detected, this operation waits for the conflicting transactions to commit or abort, and then restarts the query execution. To disambiguate writes from different query execution attempts of the same statement, transaction manager 474 allocates a unique restart count for each restart attempt, which is included as part of every key written to the distributed database.

Before any KV RSO can execute, it needs to know a read timestamp (e.g., read timestamp 803) and/or the restart count. In an example, all key value query plans are restricted to execute on a single process via forcing dop=1 (e.g., degree of parallelism equal to one). Picking a read timestamp and allocating a restart count are both currently done as part of initializing a StatementContext when creating an sf::Statement, and all RSOs then use the same sf::Statement, and transitively the same StatementContext.

In some implementations of KV RSOs, a globally shared StatementContext instance is utilized to communicate information between RSOs. A set of implicit dataflows 820 are shown to the right of query plan 800, as opposed to explicit data flows in the left side of query plan 800. Relying on essentially a global variable to communicate information between RSOs is a clear blocker for trying to parallelize scans across multiple processes. The subject system provides embodiments for exchange of information that can be explicitly passed between RSOs in an execution node, such that parallelism is provided while ensuring correct execution. In an example, both efficiency (due to the transaction status cache) and correctness (of concurrent writes) can depend on using the same StatementContext object across all RSOs and RSOi within one process.

Figure 9:
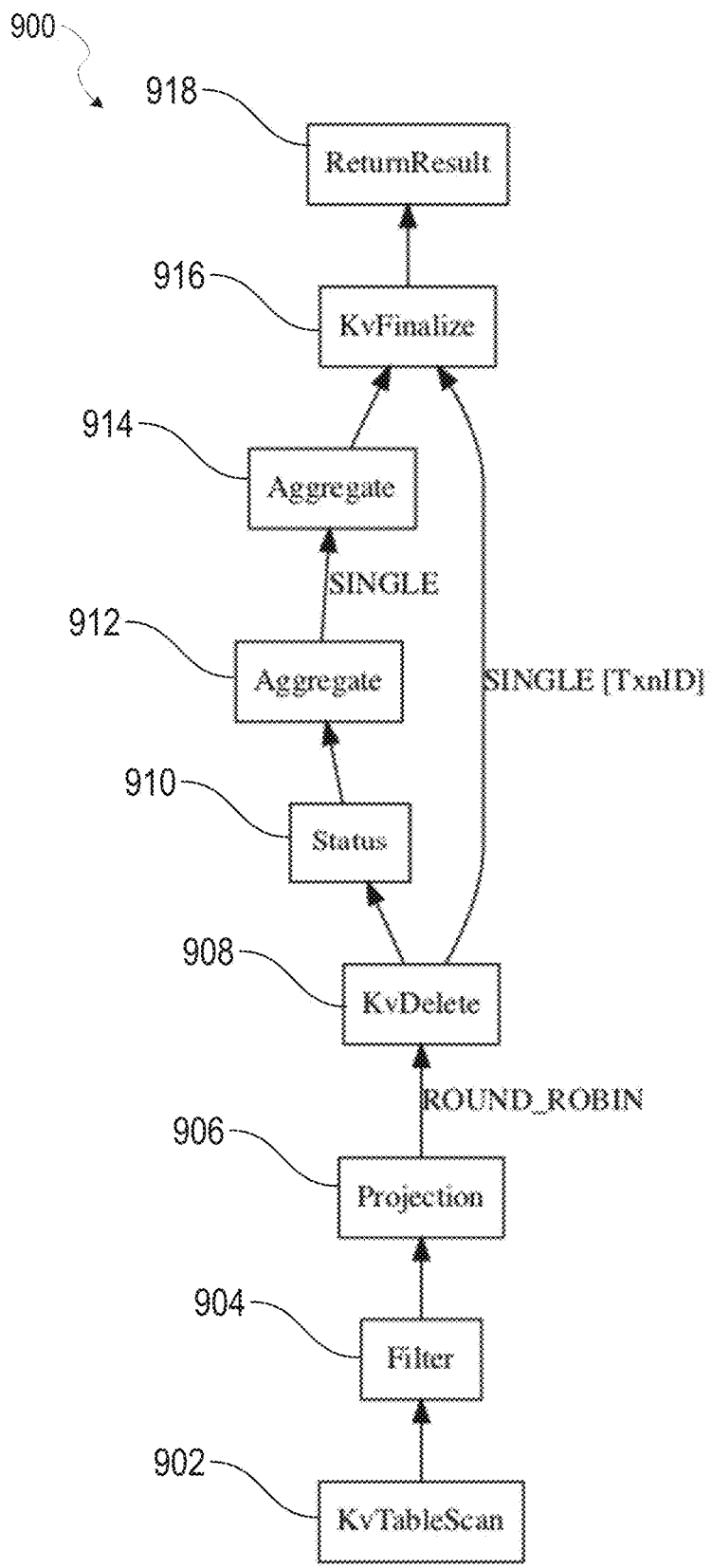
FIG. 9 illustrates an example block diagram of a processing flow of operations performed by a database system in accordance with embodiments of the subject technology.

FIG. 9 illustrates an example block diagram of a processing flow of operations performed by a database system in accordance with embodiments of the subject technology. The processing flow is represented as query plan 900, in an implementation, and is executed at least by a transaction manager (e.g., distributed transaction manager 474) that runs within an execution node (e.g., execution node 302-1), and can work in conjunction with a distributed database (distributed database store 480) on a storage platform (e.g., storage platform 104).

As shown, query plan 900 includes a set of operations including key value table scan 902, filter 904, projection 906, key value delete 908, status 910, aggregate 912, aggregate 914, key value finalize 9016, and return result 918.

In an embodiment, RangeSets (or "range sets") are distributed across KvTableScan RSOi corresponding to KV table scan operation 90. Distributing RangeSets across KvTableScan RSOi permits setting local_dop (e.g., local degree of parallelism) to a value higher than 1 thereby indicating that the KV table scan operation 90 can be executed using additional execution nodes (or processes) where in an implementation each execution node includes respective instances of distribution transaction managers (or respective transactional access layers).

Next, a background worker is provided to asynchronously distribute the read timestamp. As mentioned herein, the term "worker" can refer to a particular execution node that performs an operation(s), or can refer to a process running on a particular execution node that performs an operation(s), and each worker can be assigned different operations to be performed for executing query plan 900. Moreover, each worker can be enabled to communicate with other workers and performs operation(s) conjunctively with other workers as discussed further herein. Further, the term "process" in this context can refer to a particular execution node where a particular process from multiple processes is each executed on different execution nodes, however, it is also understood that multiple processes can also be executed on a single execution node in an embodiment.

To be able to parallelize scans across processes, respective distributed transaction managers are instantiated on each process with the same read timestamp. This will be done by creating a new control message, DistributedTransactionState, that is broadcasted and handled as part of a new worker process, DistributedTransactionStateWorker, as part of query initialization. In an example, the rank 0 process will initialize distributed transaction manager 474, and broadcast the read timestamp. All other workers will block to receive the read timestamp before executing any KV RSO (e.g., key value rowset operator).

In an implementation, multi-process read parallelism can provide significant improvement to read throughput for RangeSet-enabled KV queries.

The following discussion relates to all conflicts being sent from KvDelete 908 to KvFinalize 916.

In an embodiment, the same StatementContext instance is being used across both KvDelete 908 and KvFinalize 916, so that write conflicts discovered while KvDelete 908 executes are known to KvFinalize 916 when it must decide to finalize or restart. Each KV RSO that does writes receives a restart count from the DistributedTransactionStateWorker process, and sends KvFinalize 916 a SerializableObject of the conflicting transactions. KvFinalize 916 performs a union all operation of serializable objects to produce a list of conflicting transactions. If there were conflicting transactions, KvFinalize 916 provides distributed transaction manager 474 with the list of conflicting transactions to wait on, and restart.

Alternatively, KvFinalize 916 reports success to ReturnResult 918. Alternatively, without execution node restart support, KvFinalize 916 waits for all conflicting transactions to end, and then return an error to compute service manager 108 for retry.

As mentioned herein, "KvDelete" refers all KV RSOs (key value rowset operators) that perform write operations.

The following is a discussion of another example based on the processing flow shown in query plan 900.

The following discussion relates to read timestamp distribution.

In an embodiment, distributed transaction manager 474 creates a StatementContext object with a pre-assigned read timestamp, and also can create a StatementContext object with a pre-assigned restart count. In addition, the restart count can be retrieved from a StatementContext object.

In an example, read timestamp distribution is performed as part of an initialization process to retrieve various metadata for distributed transaction manager 474 to utilize.

The following are example code statements:

```
/**
 * Defines options for distributed transaction manager statements
 */
struct StatementOptions {
/// whether the statement is read only ReadOnly m_readOnly = ReadOnly::NO;
/// the read timestamp of this statement optional<Timestamp> m_readTs =
boost::none;
/// the RestartCount of this statement. optional<RestartCount> m_restartCount =
boost::none;
};
class Database {
// ...
/** Create a new statement and begin its execution.
 *
 * The future will complete when initialization of the statement has
 * completed. If this is the first statement in the transaction, then a
 * transaction will be implicitly created and initialized as well.
 *
 * StatementCount is meant to map to the statement number in the SQL transaction.
 * It is not required to start from zero, and it may have gaps.
 *
 * When a statement is created, it will acquire a monotonic increasing
```

```
* gsAttemptCount
* and persist it into the transaction status table. It is guaranteed that each statement
* of a transaction will have a unique gsAttemptCount. However, these
* gsAttemptCounts may have gaps. For each gsAttemptCount, a statement also
* maintains a xpRestartCount, which is incremented whenever a statement is
* restarted due to conflicts.
*
* @param statementCount The statement number within the SQL transaction.
* Writes from statements with a lower statementCount in the same
* transaction will be visible.
* Finalized writes from this statement will be visible to statements
* with a higher statementCount in the same transaction.
* @param options The additional options for this statement.
* @return A StatementContext for use in executing a statement.
/*
semi_future<StatementContext> createStatement(ub4 statementCount,
const StatementOptions& options = { });
// ...
/**
*                   @return the read timestamp of this statement
*/
Timestamp getReadTimestamp( );
/**
*                   @return the RestartCount of this statement
*/
RestartCount getRestartCount( );
};
```

In an implementation, the createStatement operation from the above example re-reads the Transaction Status Table entry for the current transaction even when the read timestamp and restart count has been specified, as the distributed transaction manager 474 expects it to be populated.

The following discussion relates to integration of a transaction manager (e.g., distributed transaction manager 474) on a given execution node.

In an implementation, an sf::Statement currently holds a pointer to a DistributedTransactionContext object, which itself holds the StatementContext object, and centralizes the logic for interacting with distributed transaction manager 474 in an execution node. In an example, an operation for sf::Statement::parse currently does both parsing of the execution plan and initialization of distributed transaction manager 474, and this is refactored to be able to initialize distributed transaction manager 474 different depending on if the execution node worker is the rank 0 worker or not the rank 0 worker.

The following are example code statements:

```
class DistributedTransactionContext {
//...
/** Start a Distributed transaction */
// Remove this
void beginDistributedTransaction(const ExecutionPlanPlan& execPlan);
// Parse all needed information from the execution plan.
void parseDistributedTransaction(const ExecutionPlanPlan& execPlan);
// Create a new StatementContext and initialize it.
// Asserts that no StatementContext instance currently exists.
void createDistributedTransaction( );
// Creates a new StatementContext, if it doesn't already exist,
// with the provided RT & RC.
// Asserts that if a StatementContext already exists, then the RT & RC match.
void openDistributedTransaction(ReadTimestamp, RestartCount restartCount);
// Destroy the current distributed StatementContext.
// To be used when XP Scheduler V2 supports query restarts, and we need to
// reset distributed transaction state.
void closeDistributedTransaction( );
/** Commit a distributed transaction if in auto-commit mode, or finalize the
statement otherwise. */
void commitDistributedTransaction( );
//...
}
```

In an embodiment, compute service manager 108, as part of performing query compilation to generate a query plan (e.g., query plan 900) including a given transaction for a query (e.g., where such a transaction includes one or more statements to be executed on a given database such as distributed database store 480), assigns a particular execution node with a rank of 0, indicating that this execution node is to be assigned the role of a "leader" for execution of the transaction where other execution nodes are "followers" with a different rank (e.g., 1 or higher), which is discussed further in the following.

In an implementation, a worker with a rank of 0 is assigned as a leader of performing the work (e.g., transaction, RSO, and the like), and other workers with a rank of 1 or higher are followers of the worker with the rank of 0. In an embodiment, each worker can execute as different threads on a same execution node, while in another embodiment each worker executes on a different execution node. When a worker has a rank of zero then a new transaction is created, while a different worker has a rank greater than zero opens an existing transaction using metadata provided in DistributedTransactionContext object.

In an embodiment, sf::Statement::parse operation invokes a DistributedTransactionContext::parseDistributedTransaction operation for KV queries, as the information in the SDL under the kvDatastore key is utilized in every process. Such a parse operation records and validates the information needed to later initialize distributed transaction manager 474.

If the execution node worker is the rank 0 worker, then distributed transaction manager 474 will be initialized using a createDistributedTransaction operation (e.g., create distributed transaction). Otherwise, the execution node worker provides the read timestamp and restart count to an openDistributedTransaction operation (e.g., open distributed transaction). In both cases, the work of connecting to distributed database store 480 and initializing distributed transaction manager 474 continues to be done asynchronously, so as not to block in Statement::parse operations (e.g., statement parse operations).

The following is a discussion of an execution node that provides the functionality described above.

An initialization process is performed for a given execution node(s). In an example, such an initialization process can be performed in an asynchronous manner as mentioned before, whereas consuming can be performed in a "lazy" manner (e.g., performed when needed). In an example with a transaction(s) that accesses hybrid tables for linearizable storage provided by a distributed database (e.g., FoundationDB) and also accesses a second database of a different type (e.g., one that stores tables using micro-partitions), operations can be performed on data from the second database to begin with and when an RSO is received at a later time to perform operations on the distributed database, at that later time an initialization process can be performed for the execution node. In this manner, there is no explicit blocking of any access to data any time prior to initialization.

After initialization, a mechanism is provided for information to be broadcasted and received between execution node workers. The communication is being done between workers and outside the context of any RSO, so this will become a new ControlMessage object (e.g., control message) called DistributedTransactionState (e.g., distributed transaction state). Upon an execution node worker receiving a DistributedTransactionState message, the execution node will forward the message to the new DistributedTransactionStateWorker object to be processed. To keep things centralized, both sending and receiving messages will be a part of DistributedTransactionState Worker's API.

The following are example code statements for a worker that processes control messages:

```
/**
 * A worker which processes DistributedTransactionState control messages.
 *
 * These messages contain transaction metadata which is distributed
 * across workers,
 * and maintains the most recently updated metadata for RSOs to consume for
 * initialization.
 *
 * This class should only ever be instantiated once.
 */
class DistributedTransactionStateWorker : public BaseWorker { public:
/** Get the DistributedTransactionState associated with a given xpRestartCount.
 *
 * If the DistributedTransactionState for the provided xpRestartCount has not yet
been received
 * and processed, then this function will block until the DistributedTransactionState
is known.
 *
 * @param xpRestartCount The number of times that an RSO has been restarted.
 * This is expected to always be 0 until execution node restarts are supported and
 * enabled.
 * @return A received DistributedTransactionState, such that state.xpRestartCount
 * == xpRestartCount.
 */
static DistributedTransactionState getState(ub4 xpRestartCount);
/** Process a received DistributedTransactionState control message.
 *
 * The ControlMessage should have already been checked to be a
 * DistributedTransactionState message.
 *
 * @param msg The control message that is received.
 * Ownership of msg is transferred to deliverMessage.
 */
static void deliverMessage(ControlMessage* msg);
```

-continued

```
/** Broadcast the given DistributedTransactionState to all workers (including
ourself).
*
* @param state the DistributedTransactionState to broadcast.
*/
static void broadcastState(const DistributedTransactionState& state);
private:
//...
};
```

In an implementation, broadcastState as shown above is a thin wrapper that copies the provided state into a ControlMessage object, and invokes a ProcessGroup::broadcastControlMessage( ) operation. In an implementation, a deliverMessage object is the handler for CTYPE_DISTRIBUTEDTRANSACTION_STATE messages registered in the network worker's control message handler. Delivered messages will be queued for processing in the worker, and the worker will maintain the unique restart count to DistributedTransactionState mappings that it has seen. KV RSO initialization is expected to make use of getState operation to acquire the read timestamp and restart count, if distributed transaction manager 474 has not yet been initialized for the current restart attempt.

In an embodiment, DistributedTransactionState is defined in the following:

```
namespace sf {
  struct DistributedTransactionState: public SyncMsgPayload {
    ub4 gsAttemptCount;
    ub4 xpRestartCount;
    ub1 readTimestamp[10];
  };
} // namespace sf
```

In an embodiment, DistributedTransactionState is represented in the following code statements:

```
if (ProcessGroup::getInstance( ).getSelf( ) == 0) {
    m_DistributedTransactionContext->createDistributedTransaction( );
    DistributedTransactionStateWorker :: broadcastState( /* initialized
state */
);
} else {
DistributedTransactionState state = DistributedTransactionStateWorker::
getState(0);
m_DistributedTransactionContext->openDistributedTransaction (state.
timestamp,state.restartCount);
}
```

The initialization work in createDistributedTransaction operation may begin as soon as the required information is parsed. The broadcasting of the initialized state must be done after a network worker process has been started; messages sent before that point are never delivered. An execution node worker only needs to wait on DistributedTransactionStateWorker::getState (e.g., get state operation) and open the transaction before it initializes its first KV RSO.

In an implementation, the initialization work is performed synchronously immediately after a network worker process has been started. In an example, if a notification is provided to a DistributedTransactionContext object of when the network worker process has been started, it may wait for when both initialization and execution node worker startup have finished, and then immediately perform the broadcast. Distributed transaction manager initialization for processes with rank 1 and higher may be done lazily. All KV RSOs already declare themselves marked with OPERATES_ON_KEY_VALUE_TABLE_RsoFlag_t, and the execution node may verify that the distributed transaction manager has been initialized before it invokes an initialize operation on any KV RSO, and blocks on distributed transaction manager initialization otherwise.

In view of the discussion above, a HybridKvTableScanRso with dop>1 (e.g., degree of parallelism greater than 1) is enabled. As KvDelete and KvFinalize may rely on a shared StatementContext object to communicate conflicts, the subject system ensures that KvFinalize and all DML KV RSOs are scheduled on the same process in an implementation.

The following discussion relates to read snapshot implementation and considerations.

In an embodiment, the subject system enables a consistent read snapshot across multiple processes by distributing a read timestamp.

In a multi-statement transaction, a statement should be able to see the writes of previously executed statements in the same transaction. In the subject system, multiple statements may be executed concurrently. This means that a statement might finalize during another's execution, which would naively make its writes visible in the middle of execution.

The distributed transaction manager (and other components) described herein works around this by first reading the Transaction Status Table entry for its own transaction, which contains a list of finalized statement numbers, and only ever considers writes from those statements to be visible. All concurrent Transaction Status Table updates from other statements finalizing are ignored.

This means that to support multi-statement transactions correctly, it may be required to transmit both the Read Timestamp and the list of already finalized statements. In an example, one approach transmits the full, serialized Transaction Status Table entry.

If the size of the Transaction Status Table poses a problem in the future, there is the possibility to optimize this transmission. The Transaction Status Table includes in-progress and aborted statement execution attempts, which are not required to be included. Another approach involves parsing out only the existing list of finalized statements, transmitting only those, and providing an API in the subject system to register the list of finalized statements in a transaction.

The following discussion relates to export and import of transaction conflicts between different processes.

The following are example code statements:

```
using StmtNums = optional<absl::flat_hash_set<ub4>>;
class StatementContext {
/// Return a map of the transaction IDs and their statement numbers we
```

-continued

```
should wait for.
absl::btree_map<TxnID, StmtNums> getMapConflicts( );
/// Add the given conflicting transaction ID and its statement numbers as
conflicts to the current statement.
void addTransactionConflict(TxnID txnID, StmtNums stmtNums);
};
```

In view of the above, calling addTransactionConflict causes StatementContext::hasConflicts to return true.

The following discussion relates to an execution node with respect to transaction conflicts.

In RsoiKvDelete::terminate, StatementContext::getMapConflicts( ) is called if the instance is the last local instance within a process that is being terminated. Then, the resulting map is converted into a protobuf object ConflictTransactionInfo (e.g., protocol buffer data format) that can be turned into a SerializableObject (e.g., serializable object). The SerializableObject is then sent to KvFinalize from different processes. There is a single KvFinalize instance, so KvDelete (e.g., as shown in query plan 900 discussed before) is connected to KvFinalize with a link of type SINGLE.

In RsoKvFinalize::processImpl( ), the serializable object ConflictTransactionInfos is processed and the StatementContext::addConflictingTransactions is utilized to store the conflicting transaction id and statement numbers in local statement context.

RsoKvFinalize::global Terminate is where
StatementContext::commitSnowTramTransaction is invoked to finalize the statement and potentially commit the transaction. In an example, globalTerminate operation can happen when ConflictTransactionInfos (e.g., information related to conflicts in transactions) is received from all processes. Finalization will thus wait on all conflicting transactions and statements to end before throwing an error.

Lastly, the link type from Projection to KvDelete is changed from LOCAL_SYNCHRONOUS to ROUND_ROBIN when dop>1.

Figure 10:
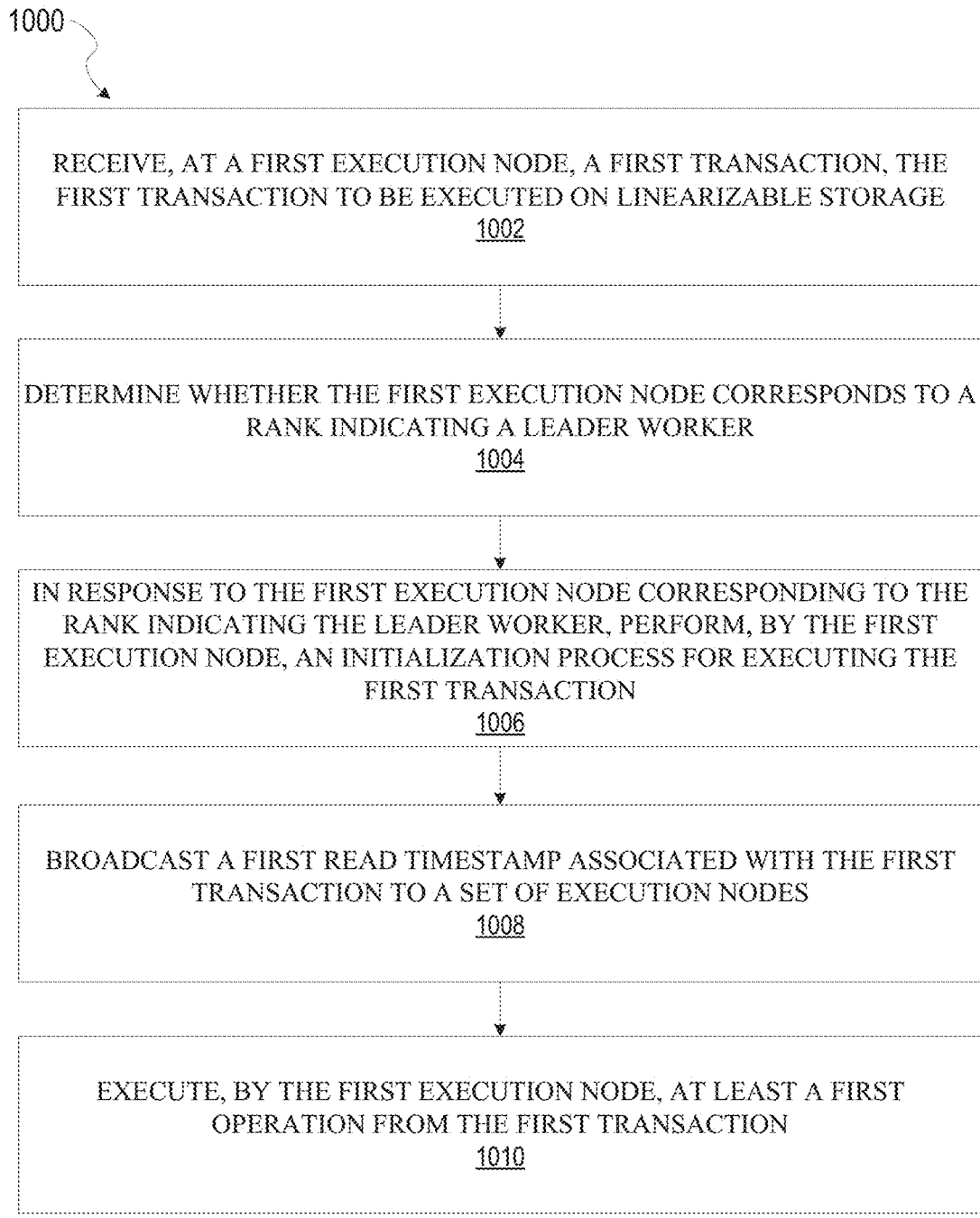
FIG. 10 is a flow diagram illustrating operations of a database system in performing a method, in accordance with some embodiments of the present disclosure.

FIG. 10 is a flow diagram illustrating operations of a database system in performing a method, in accordance with some embodiments of the present disclosure. The method 1000 may be embodied in computer-readable instructions for execution by one or more hardware components (e.g., one or more processors) such that the operations of the method 1000 may be performed by components of network-based database system 102, such as components of the compute service manager 108 or a node in the execution platform 110. Accordingly, the method 1000 is described below, by way of example with reference thereto. However, it shall be appreciated that the method 1000 may be deployed on various other hardware configurations and is not intended to be limited to deployment within the network-based database system 102.

At operation 1002, the distributed transaction manager 474 receives, at a first execution node, a first transaction, the first transaction to be executed on linearizable storage.

At operation 1004, the distributed transaction manager 474 determines whether the first execution node corresponds to a rank indicating a leader worker.

At operation 1006, the distributed transaction manager 474, in response to the first execution node corresponding to the rank indicating the leader worker, performs, by the first execution node, an initialization process for executing the first transaction.

At operation 1008, the distributed transaction manager 474 broadcasts a first read timestamp associated with the first transaction to a set of execution nodes, the set of execution nodes being different than the first execution node. The first readstamp can be understood as being transaction metadata, and other transaction metadata may be broadcasted, too. In an embodiment, transaction metadata is broadcasted which includes a timestamp, retry counter, and transaction status. Moreover, it is appreciated that any other transaction metadata may be included for being broadcasted, when appropriate, based on embodiments described throughout the disclosure herein.

At operation 1010, the distributed transaction manager 474 executes, by the first execution node, at least a first operation from the first transaction.

In an embodiment, determining whether the first execution node corresponds to a rank indicating a leader worker includes receiving metadata including information comprising a value of zero corresponding to the rank.

In an embodiment, the distributed transaction manager 474 performs the initialization process for executing the first transaction occurs in an asynchronous manner and generates a transaction context object, the transaction context object including information for a particular read timestamp and a particular restart count associated with the first transaction.

In an embodiment, the distributed transaction manager 474 performs a parse operation of a particular statement from the first transaction.

In an embodiment, performing the initialization process for executing the first transaction occurs in an asynchronous manner and the distributed transaction manager 474 generates a first control message, the first control message including first metadata associated with the first transaction, the first metadata including information related to the first read timestamp and a first restart count associated with the first transaction.

In an embodiment, the distributed transaction manager 474 sends the first control message to the set of execution nodes, each execution node from the set of execution nodes using the first control message to initialize a particular statement from the first transaction prior to executing the particular statement at each execution node.

In an embodiment, the distributed transaction manager 474 determines a set of conflicts corresponding to the first transaction, generates a serializable object including information associated with the set of conflicts, and sends the serializable object to an instance of a key value finalize object, the key value finalize object corresponding to an particular operation from the first transaction to aggregate respective set of conflicts received from the set of execution nodes.

In an embodiment, the distributed transaction manager 474 receives, at the first execution node, a second transaction, the second transaction to be executed on the linearizable storage, determines that the first execution node corresponds to a particular rank indicating a follower worker, and receives a second control message from a different execution node, the second control message including information related to a second read timestamp and a second restart count associated with the second transaction.

In an embodiment, the distributed transaction manager 474 performs, based on the second read timestamp and the second restart count, a particular initialization process for executing the second transaction, and executes, by the first execution node, at least a particular operation from the second transaction.

In an embodiment, determining that the first execution node corresponds to the particular rank indicating the follower worker includes receiving particular metadata including information comprising a value of one or greater corresponding to the particular rank.

In an embodiment, the distributed transaction manager 474, in response to the first execution node corresponding to the rank indicating the follower worker, generates a second transaction context object based at least in part on the second read timestamp and the second restart count.

Figure 11:
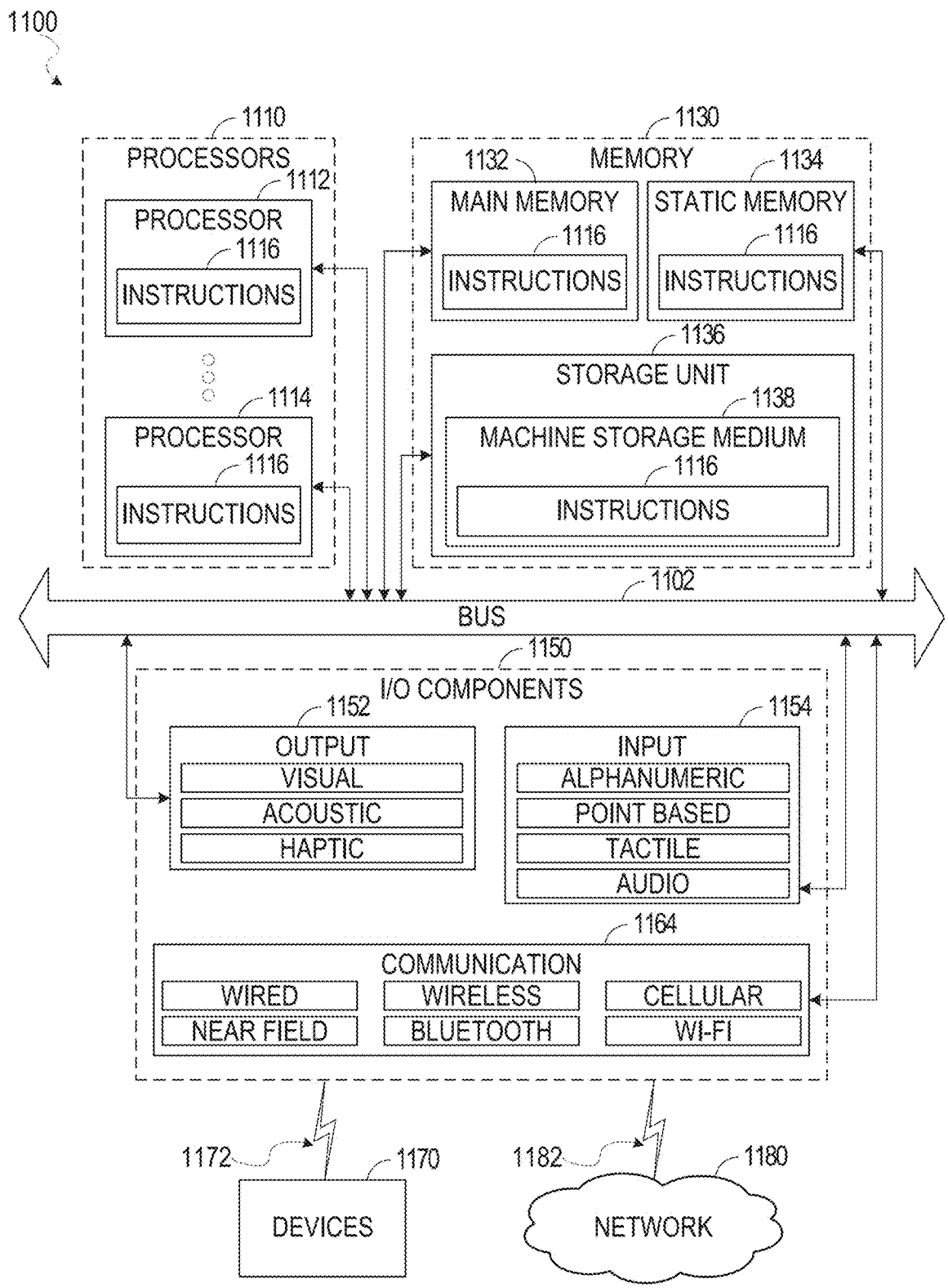
FIG. 11 illustrates a diagrammatic representation of a machine in the form of a computer system within which a set of instructions may be executed for causing the machine to perform any one or more of the methodologies discussed herein, in accordance with some embodiments of the present disclosure.

FIG. 11 illustrates a diagrammatic representation of a machine 1100 in the form of a computer system within which a set of instructions may be executed for causing the machine 1100 to perform any one or more of the methodologies discussed herein, according to an example embodiment. Specifically, FIG. 11 shows a diagrammatic representation of the machine 1100 in the example form of a computer system, within which instructions 1116 (e.g., software, a program, an application, an applet, an app, or other executable code) for causing the machine 1100 to perform any one or more of the methodologies discussed herein may be executed. For example, the instructions 1116 may cause the machine 1100 to execute any one or more operations of method 500, method 600, method 700, and method 1000. As another example, the instructions 1116 may cause the machine 1100 to implement portions of the data flows illustrated in at least FIG. 4A, FIG. 4B, FIG. 8, and FIG. 9. In this way, the instructions 1116 transform a general, non-programmed machine into a particular machine 1100 (e.g., the compute service manager 108 or a node in the execution platform 110) that is specially configured to carry out any one of the described and illustrated functions in the manner described herein.

In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

The machine 1100 includes processors 1110, memory 1130, and input/output (I/O) components 1150 configured to communicate with each other such as via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1112 and a processor 1114 that may execute the instructions 1116. The term "processor" is intended to include multi-core processors 1110 that may comprise two or more independent processors (sometimes referred to as "cores") that may execute instructions 1116 contemporaneously. Although FIG. 11 shows multiple processors 1110, the machine 1100 may include a single processor with a single core, a single processor with multiple cores (e.g., a multi-core processor), multiple processors with a single core, multiple processors with multiple cores, or any combination thereof.

The memory 1130 may include a main memory 1132, a static memory 1134, and a storage unit 1136, all accessible to the processors 1110 such as via the bus 1102. The main memory 1132, the static memory 1134, and the storage unit 1136 store the instructions 1116 embodying any one or more of the methodologies or functions described herein. The instructions 1116 may also reside, completely or partially, within the main memory 1132, within the static memory 1134, within machine storage medium 1138 of the storage unit 1136, within at least one of the processors 1110 (e.g., within the processor's cache memory), or any suitable combination thereof, during execution thereof by the machine 1100.

The I/O components 1150 include components to receive input, provide output, produce output, transmit information, exchange information, capture measurements, and so on. The specific I/O components 1150 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1150 may include many other components that are not shown in FIG. 11. The I/O components 1150 are grouped according to functionality merely for simplifying the following discussion and the grouping is in no way limiting. In various example embodiments, the I/O components 1150 may include output components 1152 and input components 1154. The output components 1152 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1154 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 may include a network interface component or another suitable device to interface with the network 1180. In further examples, the communication components 1164 may include wired communication components, wireless communication components, cellular communication components, and other communication components to provide communication via other modalities. The devices 1170 may be another machine or any of a wide variety of peripheral devices (e.g., a peripheral device coupled via a universal serial bus (USB)). For example, as noted above, the machine 1100 may correspond to any one of the compute service manager 108 or the execution platform 110, and the devices 1170 may include the client device 114 or any other computing device described herein as being in communication with the network-based database system 102 or the cloud storage platform 104.

Executable Instructions and Machine Storage Medium

The various memories (e.g., 1130, 1132, 1134, and/or memory of the processor(s) 1110 and/or the storage unit 1136) may store one or more sets of instructions 1116 and data structures (e.g., software) embodying or utilized by any one or more of the methodologies or functions described herein. These instructions 1116, when executed by the processor(s) 1110, cause various operations to implement the disclosed embodiments.

As used herein, the terms "machine-storage medium," "device-storage medium," and "computer-storage medium" mean the same thing and may be used interchangeably in this disclosure. The terms refer to a single or multiple non-transitory storage devices and/or non-transitory media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 1180 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1116 may be transmitted or received over the network 1180 using a transmission medium via a network interface device (e.g., a network interface component included in the communication components 1164) and utilizing any one of a number of well-known transfer protocols (e.g., hypertext transfer protocol (HTTP)). Similarly, the instructions 1116 may be transmitted or received using a transmission medium via the coupling 1172 (e.g., a peer-to-peer coupling) to the devices 1170. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1116 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the method 500 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Conclusion

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
    at least one hardware processor; and
    a memory storing instructions that cause the at least one hardware processor to perform operations comprising:
        receiving, at a first execution node, a broadcast of an execution request for a first transaction, the broadcast of the execution request being broadcasted by a leader node for the first transaction, the execution request including an execution command corresponding to the execution request and a first execution timestamp, the execution command including a plurality of operations to execute the execution request;
        determining, by the first execution node, that the first execution node is assigned to execute at least a portion of the execution request in response to receiving the broadcast of the execution request for the first transaction, the first execution node being assigned to execute the execution command corresponding to the execution request;
        blocking receipt of a second execution timestamp associated with a second transaction;
        executing, by the first execution node, at least a first operation of the execution command corresponding to the execution request based on the first execution timestamp; and
        unblocking receipt of the second execution timestamp associated with the second transaction.

2. The system of claim 1, wherein the operations further comprise:
    receiving, at the first execution node, a second transaction;
    determining whether the first execution node corresponds to a rank indicating a leader worker for the second transaction; and
    in response to the first execution node corresponding to the rank indicating the leader worker, performing, by the first execution node, an initialization process for executing the second transaction.

3. The system of claim 2, wherein the second transaction is to be executed on a linearizable storage.

4. The system of claim 2, wherein the initialization process comprises:
    broadcasting, by the first execution node, a message associated with the second transaction to a set of execution nodes, the set of execution nodes being different than the first execution node, individual nodes of the set of execution nodes performing corresponding operations from the second transaction in response to receiving the message.

5. The system of claim 4, wherein the operations further comprise determining a first read timestamp associated with the second transaction, the message comprising the first read timestamp associated with the second transaction.

6. The system of claim 5, wherein the first read timestamp comprising a first read version, the first read version indicating a first version of a linearizable storage.

7. The system of claim 2, wherein the operations further comprise:
    executing, by the first execution node, at least a second operation from the second transaction based on the first execution node corresponding to the rank of the leader worker.

8. The system of claim 1, wherein the execution request includes a second read timestamp for the first transaction.

9. The system of claim 1, wherein the first execution node is a follower worker for the second transaction.

10. The system of claim 1, wherein the blocking receipt, executing the at least first operation, and the unblocking of the receipt is in response to determining that the first execution node is assigned to execute the portion of the execution request.

11. The system of claim 1, wherein determining that the first execution node is assigned to execute at least the portion of the execution request is based on metadata in the received broadcast.

12. The system of claim 1, wherein executing at least the first operation comprises executing at least the first operation in an asynchronous manner.

13. The system of claim 12, wherein executing at least the first operation in the asynchronous manner comprises generating a transaction context object, the transaction context object including information for a particular read timestamp and a particular restart count associated with the first transaction.

14. The system of claim 1, wherein the operations further comprise:
    performing a parse operation of a particular statement from the first transaction.

15. The system of claim 1, wherein executing at least the first operation comprises generating a first control message, the first control message including first metadata associated with the first transaction, the first metadata including information related to a first read timestamp and a first restart count associated with the first transaction.

16. The system of claim 15, wherein the operations further comprise sending the first control message to a set of execution nodes, each execution node from the set of execution nodes using the first control message to initialize a particular statement from the first transaction prior to executing the particular statement at each execution node, and each execution node blocking execution of another transaction prior to receiving the first read timestamp, the first read timestamp indicating a start of the execution of the particular statement.

17. The system of claim 1, wherein the operations further comprise:
   determining a set of conflicts corresponding to the first transaction;
   generating a serializable object including information associated with the set of conflicts; and
   sending the serializable object to an instance of a key value finalize object, the key value finalize object corresponding to a particular operation from the first transaction to aggregate respective set of conflicts received from a set of execution nodes.

18. The system of claim 1, wherein the operations further comprise:
   receiving, at the first execution node, a second transaction, the second transaction to be executed on a linearizable storage;
   determining that the first execution node corresponds to a particular rank indicating a follower worker;
   receiving a second control message from a different execution node, the second control message including information related to a third read timestamp and a second restart count associated with the second transaction;
   performing, based on the third read timestamp and the second restart count, a particular initialization process for executing the second transaction; and
   executing, by the first execution node, at least a particular operation from the second transaction.

19. A method comprising:
   receiving, at a first execution node, a broadcast of an execution request for a first transaction, the broadcast of the execution request being broadcasted by a leader node for the first transaction, the execution request including an execution command corresponding to the execution request and a first execution timestamp, the execution command including a plurality of operations to execute the execution request;
   determining, by the first execution node, that the first execution node is assigned to execute at least a portion of the execution request in response to receiving the broadcast of the execution request for the first transaction, the first execution node being assigned to execute the execution command corresponding to the execution request;
   blocking receipt of a second execution timestamp associated with a second transaction;
   executing, by the first execution node, at least a first operation of the execution command corresponding to the execution request based on the first execution timestamp; and
   unblocking receipt of the second execution timestamp associated with the second transaction.

20. A non-transitory computer-storage medium comprising instructions that, when executed by one or more processors of a machine, configure the machine to perform operations comprising:
   receiving, at a first execution node, a broadcast of an execution request for a first transaction, the broadcast of the execution request being broadcasted by a leader node for the first transaction, the execution request including an execution command corresponding to the execution request and a first execution timestamp, the execution command including a plurality of operations to execute the execution request;
   determining, by the first execution node, that the first execution node is assigned to execute at least a portion of the execution request in response to receiving the broadcast of the execution request for the first transaction, the first execution node being assigned to execute the execution command corresponding to the execution request;
   blocking receipt of a second execution timestamp associated with a second transaction;
   executing, by the first execution node, at least a first operation of the execution command corresponding to the execution request based on the first execution timestamp; and
   unblocking receipt of the second execution timestamp associated with the second transaction.

* * * * *